(12) United States Patent
Sakashita et al.

(10) Patent No.: US 10,336,380 B2
(45) Date of Patent: Jul. 2, 2019

(54) ROCKER BOGIE

(71) Applicant: Tokyo Metropolitan Industrial Technology Research Institute, Tokyo (JP)

(72) Inventors: Kazuhiro Sakashita, Tokyo (JP); Yusuke Morita, Tokyo (JP); Toshiki Masuda, Tokyo (JP); Yusuke Kobayashi, Tokyo (JP)

(73) Assignee: Tokyo Metropolitan Industrial Technology Research Institute, Tokyo (JP)

( * ) Notice: Subject to any disclaimer, the term of this patent is extended or adjusted under 35 U.S.C. 154(b) by 0 days.

(21) Appl. No.: 15/560,372

(22) PCT Filed: Mar. 24, 2016

(86) PCT No.: PCT/JP2016/059352
§ 371 (c)(1),
(2) Date: Sep. 21, 2017

(87) PCT Pub. No.: WO2016/152966
PCT Pub. Date: Sep. 29, 2016

(65) Prior Publication Data
US 2018/0072355 A1 Mar. 15, 2018

Related U.S. Application Data

(60) Provisional application No. 62/137,249, filed on Mar. 24, 2015.

(51) Int. Cl.
*B62D 37/00* (2006.01)
*B62D 11/04* (2006.01)
(Continued)

(52) U.S. Cl.
CPC .............. *B62D 37/00* (2013.01); *B62D 11/04* (2013.01); *B62D 21/186* (2013.01); *B62D 61/00* (2013.01);
(Continued)

(58) Field of Classification Search
CPC ........ B62D 11/04; B62D 37/00; B62D 61/00; B62D 21/186; B62D 61/04; B62D 61/125; B62D 63/02
(Continued)

(56) References Cited

U.S. PATENT DOCUMENTS 4,128,137 A * 12/1978 Booth .................... A61G 5/043
180/6.5
4,245,847 A * 1/1981 Knott ....................... A61G 5/06
280/47.16
(Continued)

FOREIGN PATENT DOCUMENTS

| CN | 101407163 A | 4/2009 |
|----|-------------|--------|
| JP | 2002255038 A | 9/2002 |

(Continued)

OTHER PUBLICATIONS

"International Application No. PCT/JP2016/059352, International Search Report dated May 17, 2016", w/ English Translation, (dated May 17, 2016), 5 pgs.
(Continued)

*Primary Examiner* — Joseph M Rocca
*Assistant Examiner* — Felicia L. Brittman
(74) *Attorney, Agent, or Firm* — Schwegman Lundberg & Woessner, P.A.

(57) ABSTRACT

A rocker bogie includes a first base which including a first wheel, a second wheel, and a third wheel each of which is configured to be in contact with a first flat surface, a second base including a fourth wheel which is configured to be in
(Continued)

contact with the first flat surface, and a rotary shaft connecting the first base and the second base to each other such that the second base is rotatable with respect to the first base. The rotary shaft is parallel to a first straight line which connects a rotation center of the first wheel and a rotation center of the second wheel to each other and is disposed between a rotation center of the third wheel and the first straight line, and the fourth wheel is disposed at an opposite position to the third wheel across the first straight line.

8 Claims, 17 Drawing Sheets

(51) Int. Cl.
  *B62D 61/00* (2006.01)
  *B62D 21/18* (2006.01)
  *B62D 61/04* (2006.01)
  *B62D 61/12* (2006.01)
  *B62D 63/02* (2006.01)
(52) U.S. Cl.
  CPC ........... *B62D 61/04* (2013.01); *B62D 61/125* (2013.01); *B62D 63/02* (2013.01)
(58) Field of Classification Search
  USPC ........................................................ 180/6.48
  See application file for complete search history.

(56) References Cited

U.S. PATENT DOCUMENTS

| | | | |
|---|---|---|---|
| 4,515,235 A | | 5/1985 | Yamamoto et al. |
| 6,196,343 B1 | * | 3/2001 | Strautnieks ............ A61G 5/043 180/22 |
| 7,293,801 B2 | | 11/2007 | Bertrand et al. |
| 7,942,445 B2 | | 5/2011 | Kramer et al. |
| 8,596,652 B2 | | 12/2013 | Tong et al. |
| 2004/0070159 A1 | | 4/2004 | Perelli et al. |

FOREIGN PATENT DOCUMENTS

| | | | |
|---|---|---|---|
| JP | 3559826 B2 | | 9/2004 |
| JP | 2005313720 A | * | 11/2005 |
| JP | 2005313720 A | | 11/2005 |
| JP | 2012228996 A | | 11/2012 |
| JP | 5240683 B2 | | 7/2013 |

OTHER PUBLICATIONS

"International Application No. PCT/JP2016/059352, Written Opinion dated May 17, 2016", (dated May 17, 2016), 4 pgs.
"Chinese Application No. 201680017191.X, Office Action dated May 3, 2018", w/ English Translation, (dated May 3, 2018), 8 pgs.
"European Application No. 16768869.6 Search Report dated Oct. 5, 2018", 12 pgs.

\* cited by examiner

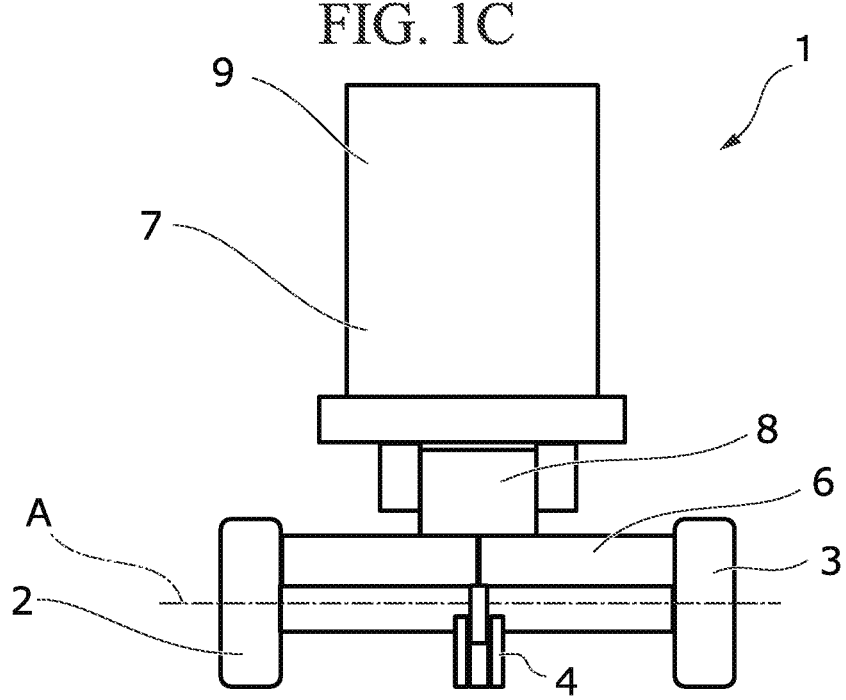
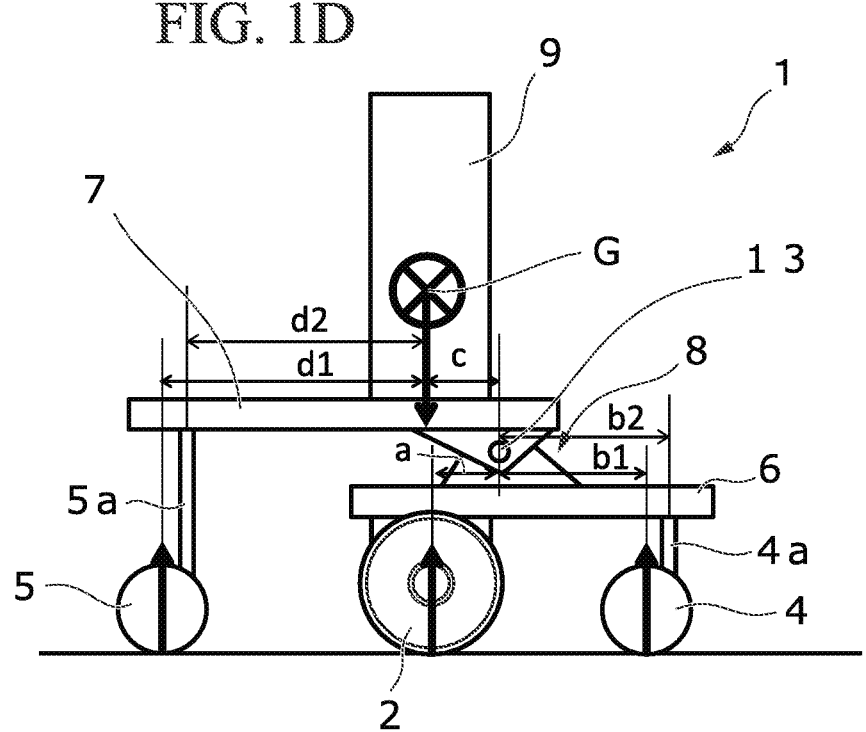

ROCKER BOGIE

PRIORITY APPLICATIONS

This application is a U.S. National Stage Filing under 35 U.S.C. 371 from International Application No. PCT/JP2016/059352, filed on 24 Mar. 2016, and published as WO2016/152966 on 29 Sep. 2016, which claims the benefit of priority to U.S. Provisional Application No. 62/137,249, filed on 24 Mar. 2015; which applications and publication are incorporated herein by reference in their entirety.

TECHNICAL FIELD

The present invention relates to a rocker bogie. Priority is claimed on U.S. Provisional Application No. 62/137,249, filed on Mar. 24, 2015, the content of which is incorporated herein by reference.

BACKGROUND ART

Surmountability, agility, and stability are required for a moving mechanism such as a robot having wheels. The surmountability of a robot having wheels means the ability of a robot which can move without being overturned or in an inoperable state during moving while maintaining a weight balance of the robot body stable in a state where a wheel is in contact with a road surface having any shape. In addition, the agility in the robot having wheels means ability of the robot which can realize spatial and temporal efficiency and diversification with respect to the operation of the robot such as lightness of a direction changing, a movement or a motion in a state where a posture is maintained. It is desirable to design an optimum structure so as to enable operation with a realistic cost while maintaining balance during these performances.

In a four-wheel structure mechanism 100 of the related art shown in FIG. 16, two driving wheels 101 which are separately driven in the same straight line are disposed on the front side, and caster wheels 102 which can freely rotate in a horizontal surface are disposed behind the two driving wheels 101. In the structure of the related art, at least three wheels among the four wheels can travel on a road surface having various unevenness while being in contact with the road surface, and a certain level of surmountability is realized.

DOCUMENT OF RELATED ART

Patent Document

[Patent Document 1] Japanese Patent No. 5,240,683
[Patent Document 2] Japanese Patent No. 3,559,826

SUMMARY OF INVENTION

Technical Problem

However, in the four-wheel structure mechanism 100 of the related art, when the four-wheel structure mechanism 100 starts to climb up a slope or an obstacle, the center G of gravity moves to a rear side of a body of the four-wheel structure mechanism 100. As described above, in the four-wheel structure mechanism 100 of the related art, since the two driving wheels 101 are disposed on the front side, a contact force between the two driving wheels 101 and the road surface is weakened, and a sufficient driving force for climbing up a slope may not be obtained. In addition, when the four-wheel structure mechanism 100 travels on a rugged road surface, the body is supported by a contact between the body and a top of the slope or a top of the obstacle, the driving wheels 101 idle, and the four-wheel structure mechanism 100 is likely to be in an inoperable state.

Moreover, in the four-wheel structure mechanism 100 of the related art, the center G of gravity is disposed at approximately the center of a quadrangle which is formed by ground contact points of the four wheels in order to secure stability. In order to rotate the four-wheel structure mechanism 100 in place on the horizontal surface, the two driving wheels 101 disposed on the front side are rotated in directions opposite to each other. In this case, a rotation center of the four-wheel structure mechanism 100 is positioned near a center point of a line which connects the centers of the two front driving wheels 101 to each other and the rotation center and the center G of gravity of the four-wheel structure mechanism 100 do not coincide with each other. Accordingly, if the four-wheel structure mechanism 100 is rotated in place, since a large inertia moment is generated, an agile operation of the four-wheel structure mechanism 100 is hindered. In addition, a rotational orbit of the four-wheel structure mechanism 100 is a circle passing through at least the ground contact points of the four wheels disposed on the front side and the rear side, and has a rotation radius which is larger than that of a rocker bogie 200 having a facing two-wheel structure described below.

That is, even when the four-wheel structure mechanism 100 of the related art has constant surmountability, the four-wheel structure mechanism 100 cannot cope with a largely uneven road surface. In addition, since the rotation center and the center G of gravity are away from each other, the inertia moment is large, the rotation orbit is large, and there is a problem that agility decreases.

Moreover, as shown in FIG. 17, as another driving mechanism having a structure including four wheels, there is a so-called facing two-wheel structure mechanism 200 in which two driving wheels 201 which are separately driven in one and the same straight line are disposed at the center, and two caster wheels 202 which can freely rotate on a horizontal surface are symmetrically disposed front and rear thereof. Compared to the four-wheel structure mechanism of the related art, in the facing two-wheel structure, since a rotation center and the center G of gravity coincide with each other, an inertia moment is minimized, and it is possible to rotate the two-wheel structure mechanism at the minimum rotation radius when the mechanism rotates in place in a horizontal direction. Accordingly, it is possible to turn the mechanism in a small space, and it is expected to move the mechanism agilely and lightly.

However, in the facing two-wheel structure mechanism 200 of the related art, since all the wheels are supported by the same structure body, when the mechanism 200 starts to climb up a slope or a step which becomes a recessed road surface, due to the structure of the mechanism 200, the driving wheels floats in the air or a contact load decreases, and as a result, the driving wheels 201 idle, and there is a concern that the mechanism 200 may be in an inoperable state. Moreover, when the driving wheels pass through a top of a hill which becomes a protruding road surface or an obstacle, the entire body becomes unstable, the floating caster wheels 202 in a traveling direction are in sudden-contact with the ground the next moment, the body rapidly rotates in the traveling direction, and a strong impact is applied to the entire body. Accordingly, in the worst case, there is a problem that the body is overturned. Therefore, the facing two-wheel structure mechanism 200 has agility in a case where the mechanism 200 rotates in place or the like. However, in the two-wheel structure mechanism 200, there is a problem that surmountability decreases with respect to unevenness and severe undulations.

Moreover, as a mechanism having a structure including six wheels, there is a rocker bogie structure. A rocker bogie 300 shown in FIG. 18 is a structure which includes two caster wheels 302 and 303 in each of a front portion and a rear portion of a body of the rocker bogie 300, and two driving wheels 304 facing each other at the center of the body. In this structure, a support member which supports the caster wheels 303 of the rear portion is rotatable with respect to support members which support the caster wheels 302 of the front portion and the center driving wheels 304 via rotation mechanisms 305. Accordingly, when the rocker bogie 300 starts to climb up a slope which is a recessed road surface or an obstacle or the driving wheels 304 reach a top of a slope which is a protruding road surface or the like, the wheels are in smooth-contact with the ground, transition of the center G of gravity is performed, each wheel is in contact with the ground so as to lick the road surface, and improved driving performance can be obtained. Accordingly, the balance of the body at the center of gravity thereof is stable, and when the rocker bogie 300 gets over the protruding road surface, a risk of overturning is sufficiently decreased. In addition, when the rocker bogie 300 rotates in place in the horizontal direction, the center G of gravity can be positioned at the center of driving wheels 304 facing each other, and it is possible to cause the center G of gravity and the rotation center to coincide with each other.

However, six wheels are required to configure the structure of the rocker bogie 300, and an independent link mechanism is required to be provided in each of the caster wheels of the rear portion. Accordingly, compared to the four-wheel configuration, the structure is complicated, the number of essential parts increases, and a cost increases. In addition, compared to the facing two-wheel structure in which only four wheels are configured, a rotation radius in a case where the rocker bogie 300 rotates in place in the horizontal direction increases. Moreover, in the rocker bogie structure having six wheels, in a case where the center of gravity moves in the disposition direction of the wheels (for example, in a case where the rocker bogie descends a slope, in a case where braking is applied to the rocker bogie during traveling, or the like), since a forward movement limit angle of the center of gravity is narrower than that of a general structure, when the center of gravity is positioned on the front side of the rotation mechanism 305, the rocker bogie overturns in a forward direction.

The present invention is made in consideration of the above-described circumstances, and an object thereof is to provide a rocker bogie of a four-wheel structure having a function of getting over an obstacle so as to lick the obstacle while realizing an agile operation and a low cost.

Solution to Problem

In order to achieve the object, according to a first aspect of the present invention, there is provided a rocker bogie, including: a first base including a first wheel, a second wheel, and a third wheel each of which is configured to be in contact with a first flat surface; a second base including a fourth wheel which is configured to be in contact with the first flat surface; and a rotary shaft connecting the first base and the second base to each other such that the second base is rotatable with respect to the first base. In addition, the rotary shaft is parallel to a first straight line which connects a rotation center of the first wheel and a rotation center of the second wheel to each other and is disposed between a rotation center of the third wheel and the first straight line, and the fourth wheel is disposed at an opposite position to the third wheel across the first straight line.

The rocker bogie may further include a structure placed on the second base, and a center of gravity of the structure may be positioned between the rotation center of the third wheel and the first straight line in a plan view.

The first wheel and the second wheel may be driving wheels which are configured to be separately driven, and the third wheel and the fourth wheel may be casters.

When viewed from the outside in a right-left direction, a ratio of a distance from a ground contact position of the third wheel to the rotary shaft to a distance from the first straight line to the rotary shaft may be 2:1.

When viewed from the outside in a right-left direction, a ratio of a distance from a ground contact position of the fourth wheel to the first straight line to a distance from the rotary shaft to the first straight line may be 3:1.

When viewed from the outside in a right-left direction, a ratio of a distance from a support shaft of the third wheel to the rotary shaft to a distance from the first straight line to the rotary shaft may be 2:1.

When viewed from the outside in a right-left direction, a ratio of a distance from a support shaft of the fourth wheel to the first straight line to a distance from the rotary shaft to the first straight line may be 3:1.

The rocker bogie may further include a rotation-braking mechanism which restricts rotation of the rotary shaft in direction in which the fourth wheel moves away from a contact surface when the fourth wheel moves away from the ground contact surface.

In a state where the rocker bogie is placed on a horizontal surface, a position of the rotary shaft in a vertical direction may be the same as or may be vertically below a position of the first straight line.

Effects of Invention

According to the rocker bogie according to the aspect of the present invention, it is possible to realize high agility and high surmountability on an uneven ground at low cost without increasing the number of parts.

In addition, if the rotation-braking mechanism is provided, it is possible to improve an overturn limit angle in a forward direction which is a drawback of a rocker bogie structure, the overturn limit angle equivalent to a four-wheel vehicle having a general facing two-wheel structure is maintained, and it is possible to secure stable traveling.

BRIEF DESCRIPTION OF DRAWINGS

FIG. 1C is a front view showing the rocker bogie according to the embodiment of the present invention.

FIG. 1D is a side view showing the rocker bogie according to the embodiment of the present invention.

DESCRIPTION OF EMBODIMENTS

Hereinafter, the present invention will be described with reference to a preferred embodiment.

[Four-wheel Rocker Bogie Structure and Operation Principle thereof]

Figure 1A:
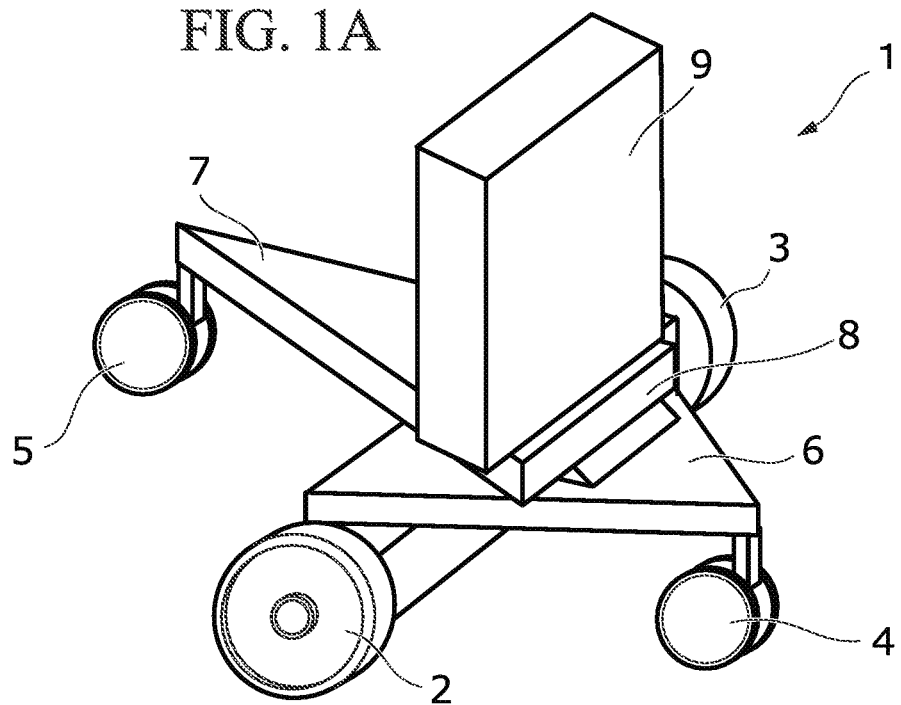
FIG. 1A is a top perspective view showing a rocker bogie according to an embodiment of the present invention.
Figure 1B:
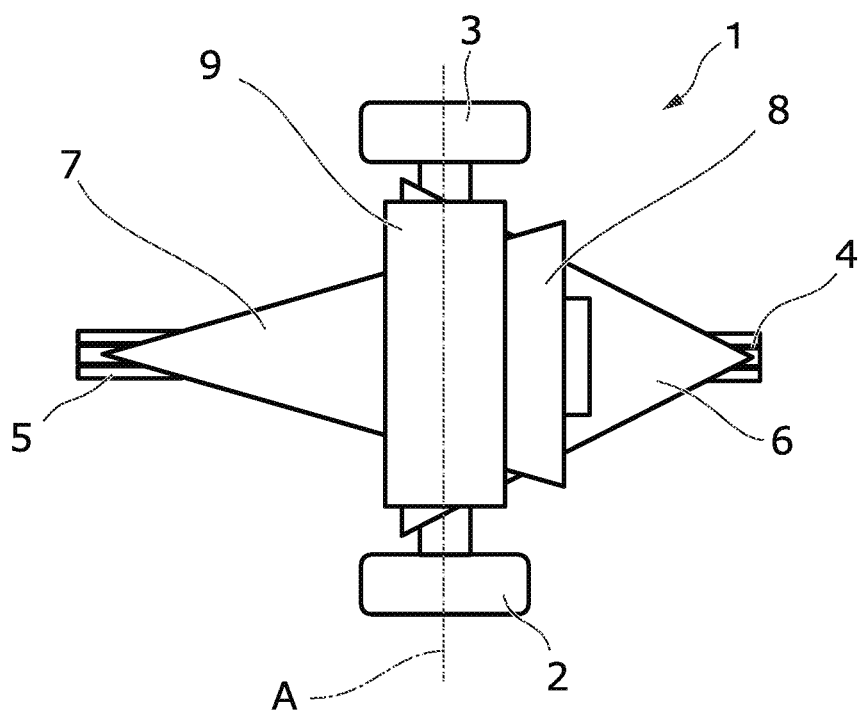
FIG. 1B is a top view showing the rocker bogie according to the embodiment of the present invention.

FIGS. 1A to 1D show a rocker bogie 1 according to an embodiment of the present invention. FIG 1A is a top perspective view of the rocker bogie 1, FIG. 1B is a top view of the rocker bogie 1, FIG. 1C is a front view of the rocker bogie 1, and FIG. 1D is a side view of the rocker bogie 1.

As shown in FIGS. 1A to 1D, a wheel (first wheel) 2 and a wheel (second wheel) 3 which are two driving wheels facing each other and a wheel (third wheel) 4 which is disposed on a front side of the wheels 2 and 3 are placed on a structure (first base) 6, and a wheel (fourth wheel) 5 which is disposed on a rear side is placed on a structure (second base) 7. In addition, the structure 7 is connected to the structure 6 via rotation mechanism 8 which includes a rotary shaft.

Moreover, a structure 9 which is a main body is placed on the structure 7.

The two driving wheels 2 and 3 disposed at the center can be independently driven. When the rocker bogie 1 moves forward, the driving wheels 2 and 3 rotate forward at the same speed, and when the rocker bogie 1 moves rearward, the driving wheels 2 and 3 rotate rearward at the same speed. Moreover, when the rocker bogie 1 is rotated in a horizontal direction, the driving wheels 2 and 3 rotate in directions opposite to each other.

Each of the wheels 4 and 5 is a caster and can rotate in a free direction on a horizontal surface. In addition, in the present embodiment, the wheels 4 and 5 do not have a driving mechanism.

In addition, each of the wheels 4 and 5 is not limited to the caster, and a ball caster or an Omni-Wheel (registered trademark) which is an omni-directional wheel may be appropriately adopted.

If the caster is used as each of the wheels 4 and 5, it is possible to realize a rocker bogie which is inexpensive and has high traveling performance.

Meanwhile, if the ball caster or the Omni-Wheel is used as each of the wheels 4 and 5, positions of support shafts $4a$ and $5a$ which connect the structures 6 and 7 and the wheels 4 and 5 to each other and ground contact points of the wheels 4 and 5 always are the same to each other in a plan view. Accordingly, it is possible to realize a rocker bogie which has higher stability during traveling. In addition, if the ball caster or the Omni-Wheel is used, unlike the caster, a space for rotation (yawing) around the support shafts $4a$ and $5a$ is not necessary.

Each of the structure 6 and the structure 7 has a plate shape, and in the present embodiment, has a triangular shape in a plan view. As a material of each of the structure 6 and the structure 7, metal, wood, a resin material, ceramics or the like may be used, and the material is not particularly limited as long as it has characteristics suitable for the application.

Figure 5:
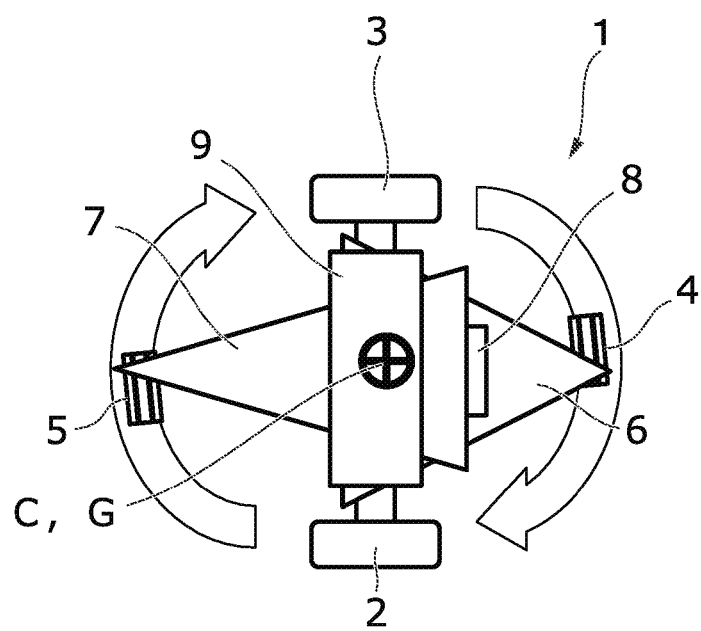
FIG. 5 is a view showing a state where the rocker bogie 1 rotates in place.

In the present embodiment, as shown in FIG. 5, since the center G of gravity can be a midpoint of the driving wheels 2 and 3, when the rocker bogie 1 rotates in the horizontal direction, a rotation center C and the center G of gravity coincide with each other. Accordingly, an inertia moment due to the center G of gravity is not generated. In addition, in the present embodiment, the number of the wheel is four, and when the rocker bogie 1 rotates in place in the horizontal direction, since the rocker bogie 1 rotates with the center of the four wheels 2 to 5 as an axis, as shown by an arrow in FIG. 5, the rocker bogie 1 can rotate with a small rotation radius. Accordingly, it is possible to turn the rocker bogie 1 in a small space, and it is expected to move the rocker bogie 1 agilely and lightly.

Here, in the present embodiment, a direction parallel to an axle of the driving wheels 2 and 3 is referred to as a right-left direction, a direction perpendicular to the axle of the driving wheels 2 and 3 in the horizontal direction is referred to as a forward-rearward direction, a side on which the wheel 4 is provided is referred to as a front side, and a side on which the wheel 5 is provided is referred to as a rear side. In addition, a vertical direction when the rocker bogie 1 is placed on the horizontal surface is referred to as an up-down direction, an upper side in the vertical direction is referred to as an upper side, and a lower side in the vertical direction is referred to as a lower side.

Figure 3:
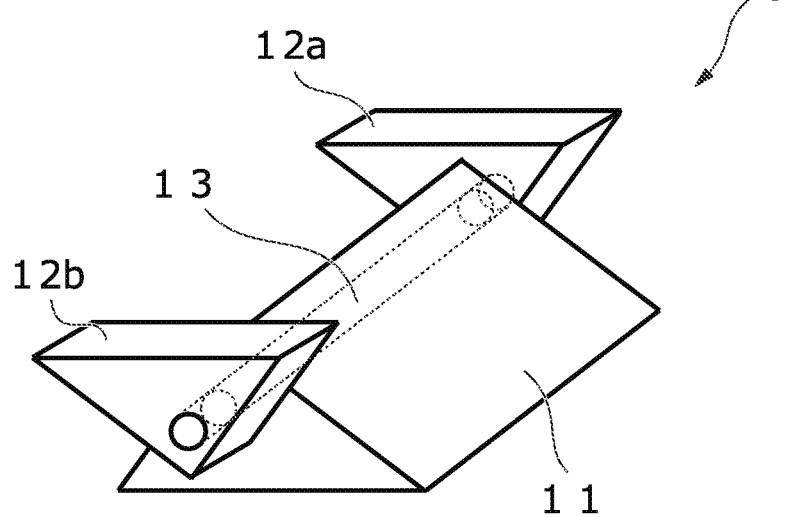
FIG. 3 is a view showing a rotation mechanism of the rocker bogie according to the embodiment of the present invention.

As shown in FIG. 3, the rotation mechanism 8 is configured of a fixation member 11 which is a portion fixed to the structure 6, a fixation member 12a and fixation member 12b which are fixed to the structure 7, and a rotary shaft 13. The fixation member 12a and the fixation member 12b are disposed in a state where the fixation member 11 is interposed therebetween. The fixation members 11, 12a, and 12b are disposed on the rotary shaft 13, and as a result, the structure 7 rotates with the rotary shaft 13 as a center with respect to the structure 6.

As shown in FIG. 1B, the rotary shaft 13 is parallel to an axle (first straight line) A of the driving wheels 2 and 3 facing each other, and the rotary shaft 13 is disposed such that a vertical projection line of the rotary shaft 13 is projected in a contact triangle which is formed by the wheels 2, 3, and 4.

Figure 2A:
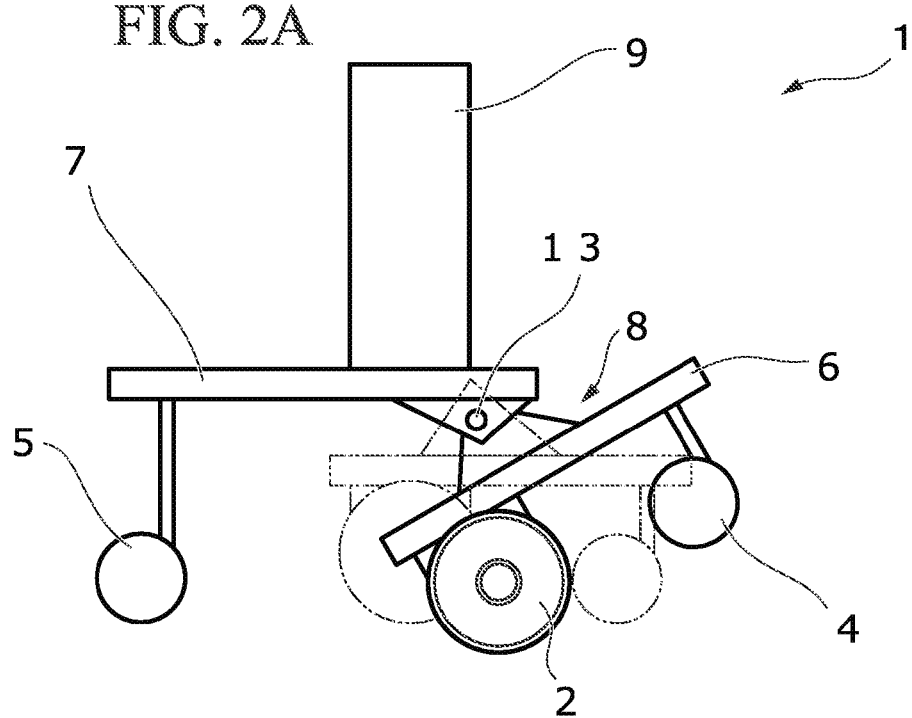
FIG. 2A shows a state where a rocker bogie 1 gets over a protruding road surface.
Figure 2B:
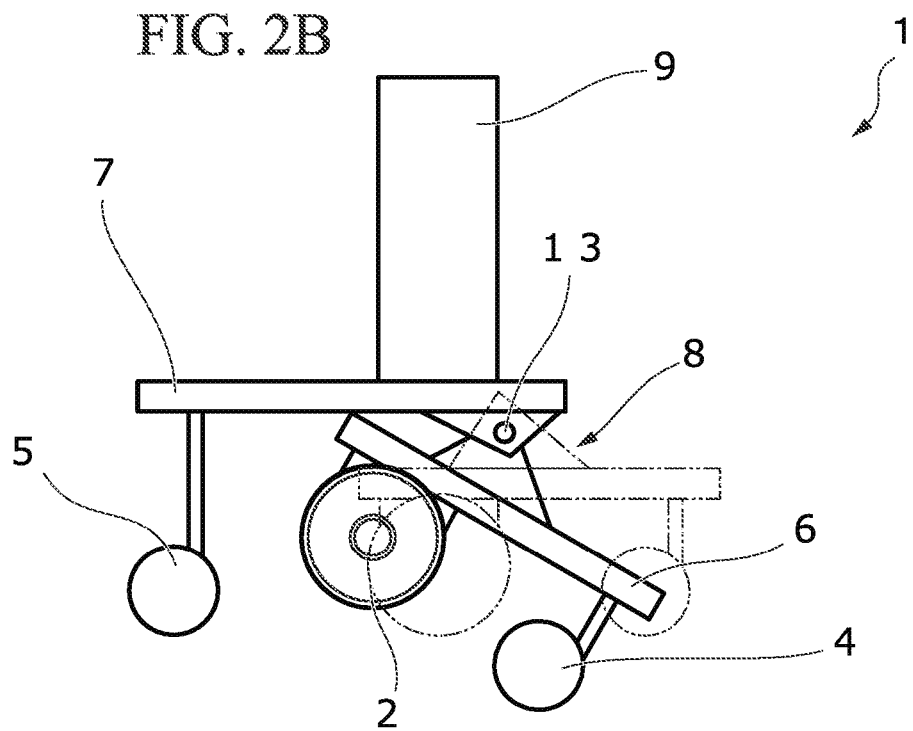
FIG. 2B shows a state where the rocker bogie 1 gets over a recessed road surface.

When the rotation mechanism 8 is used, if the movement of the structure around the rotary shaft is viewed from the side, the movement is as shown in FIG. 2. FIG. 2A shows a state where the rocker bogie 1 gets over a protruding road surface, and FIG. 2B shows a state where the rocker bogie 1 gets over a recessed road surface.

Figure 4A:
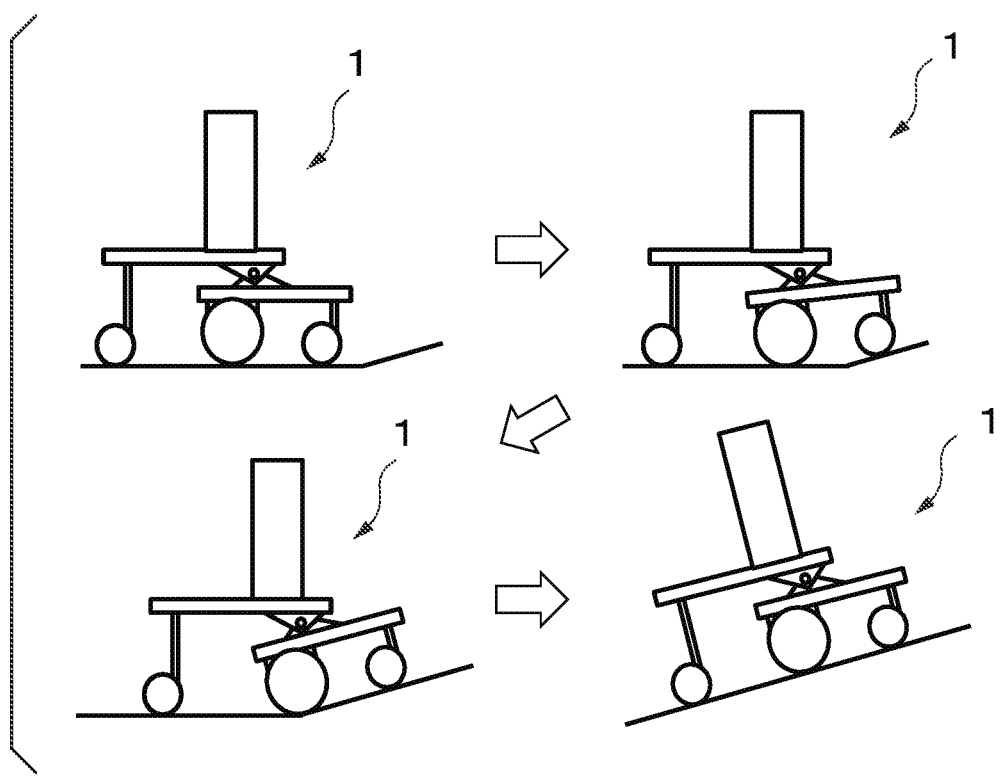
FIG. 4A shows contact states of wheels when the rocker bogie 1 starts to climb up an inclined plane.
Figure 4B:
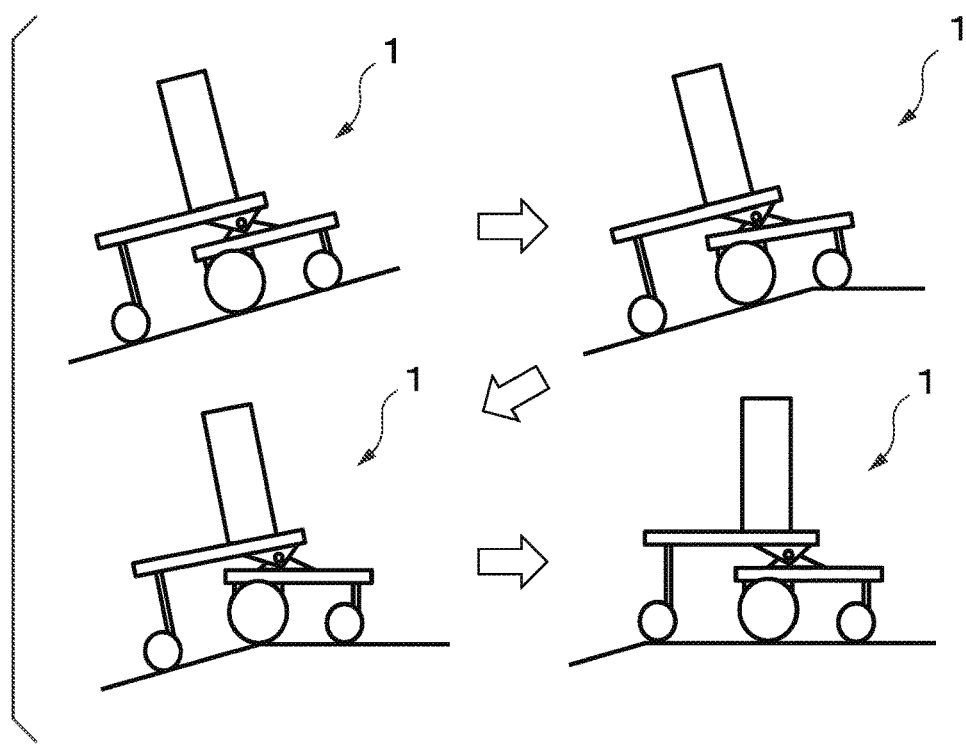
FIG. 4B shows contact states of the wheels when the rocker bogie 1 finishes the climbing with respect to the inclined plane.
Figure 4C:
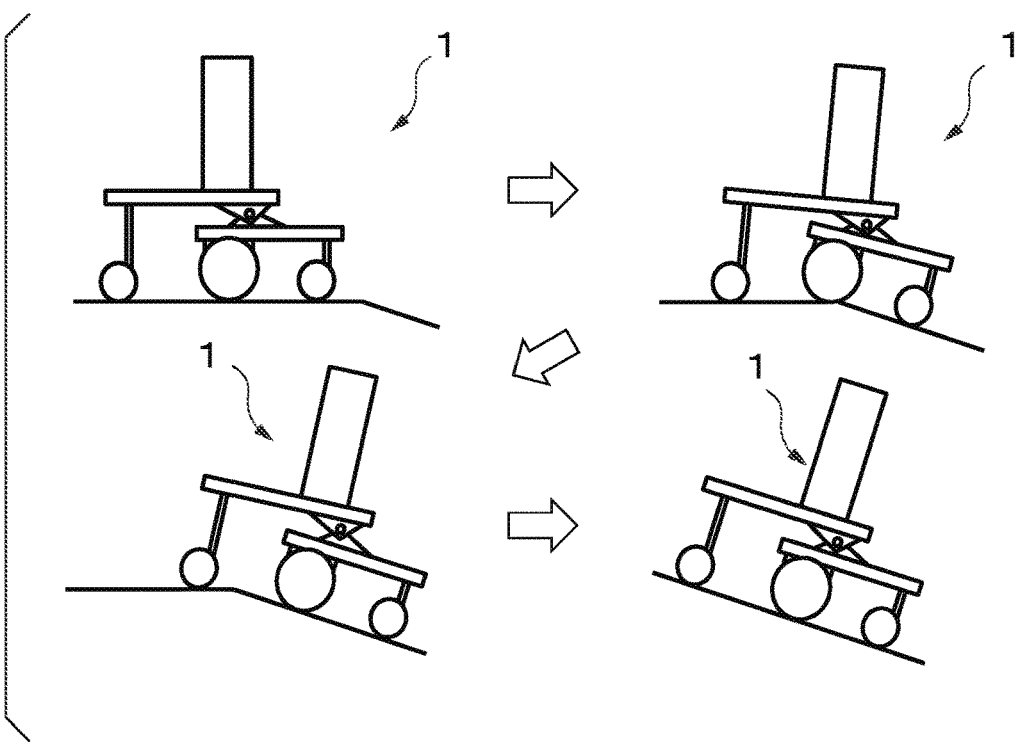
FIG. 4C shows contact states of the wheels when the rocker bogie 1 starts to descend the inclined plane.
Figure 4D:
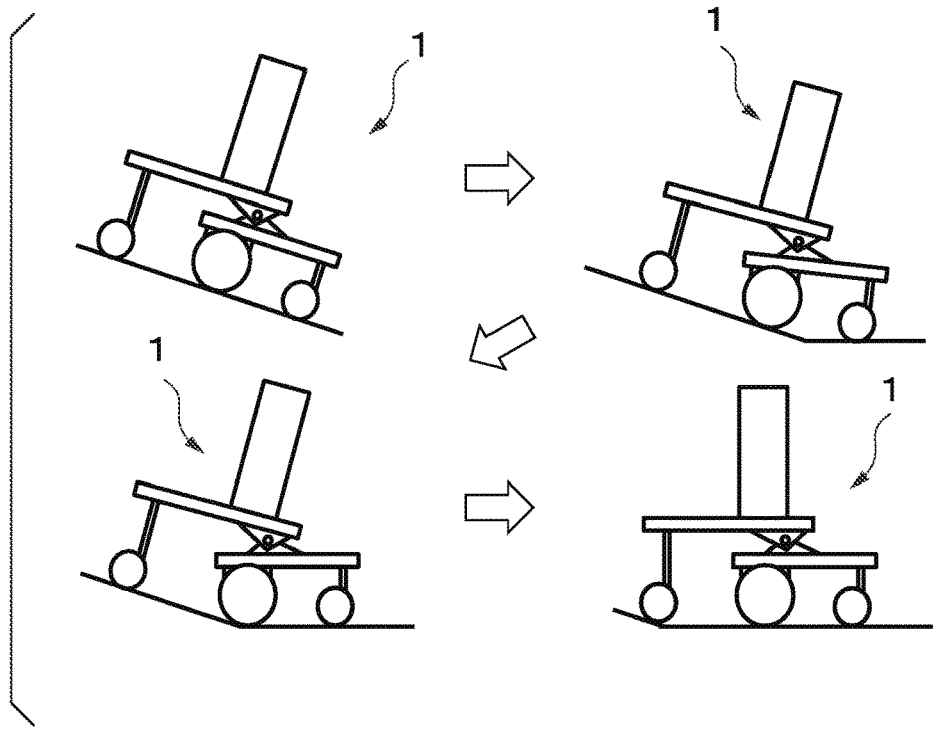
FIG. 4D shows contact states of the wheels when the rocker bogie 1 finishes the descending with respect to the inclined plane.
Figure 4E:
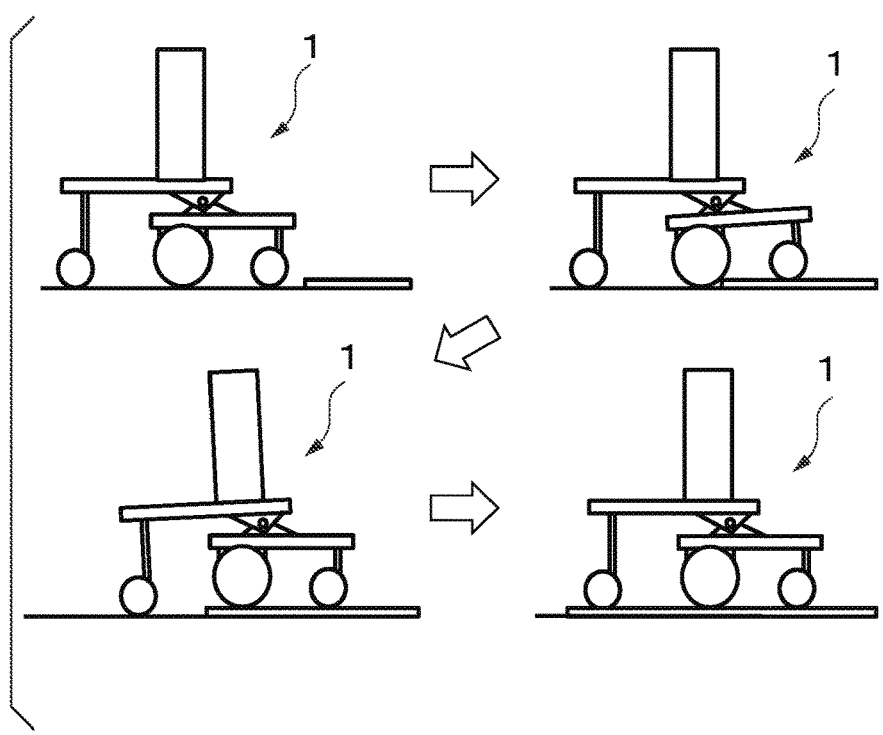
FIG. 4E shows contact states of the wheels when the rocker bogie 1 climbs up a step.
Figure 4F:
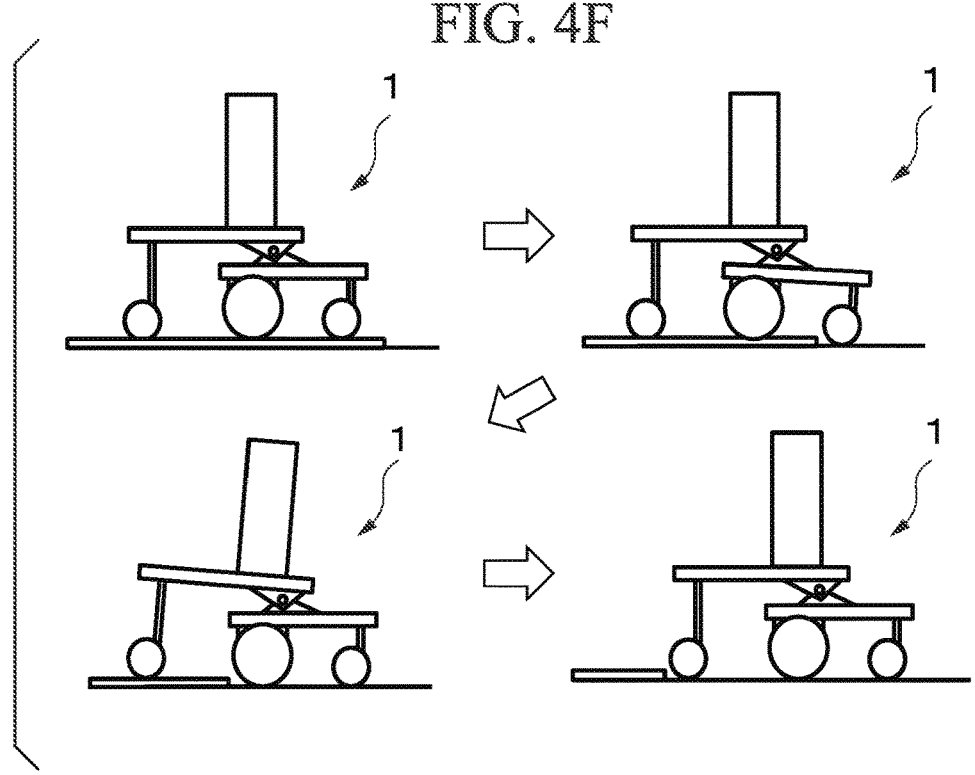
FIG. 4F shows contact states of the wheels when the rocker bogie 1 descends the step.
Figure 4G:
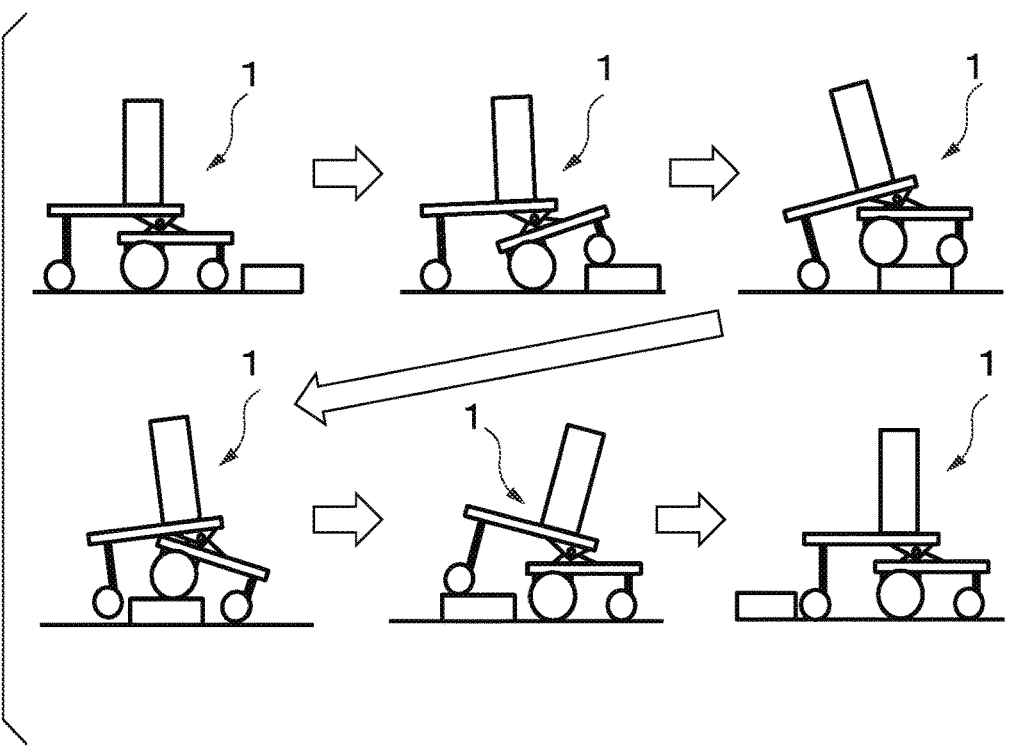
FIG. 4G shows contact states of the wheels when the rocker bogie 1 gets over an obstacle.

In addition, FIGS. 4A to FIG. 4G show a contact state of each wheel when the rocker bogie 1 having the rotation mechanism 8 actually gets over an inclined plane or the like. FIG. 4A shows contact states of wheels when the rocker bogie 1 starts to climb up an inclined plane, FIG. 4B shows the contact states of the wheels when the rocker bogie 1 finishes the climbing with respect to the inclined plane, FIG. 4C shows the contact states of the wheels when the rocker bogie 1 start to descend the inclined plane, FIG. 4D shows the contact states of the wheels when the rocker bogie 1 finishes the descending with respect to the inclined plane, FIG. 4E shows contact states of the wheels when the rocker bogie 1 climbs up a step, FIG. 4F shows contact states of the wheels when the rocker bogie 1 descends the step, and FIG. 4G shows contact states of the wheels when the rocker bogie 1 gets over an obstacle.

Since the rocker bogie 1 has the rotation mechanism 8, as shown in FIG. 4, the rocker bogie 1 can get over the road surfaces having various shapes without idling in a state where sufficient contact forces are held to the driving wheels, and the rocker bogie 1 can get over the road surfaces in a state where all wheels are in contact with the ground. Moreover, since the rocker bogie 1 has the rotation mechanism 8, it is possible to move the rocker bogie 1 in a state where the rocker bogie 1 is prevented from rapidly rotating in a traveling direction, that is, in a state where the overall balance of the body is stable.

In general, in a case where the rocker bogie 1 is placed on the horizontal surface, in order to stably and equally apply a load to four wheels, the center of gravity of the entire structure including the structure 9 is adjusted to be positioned immediately above the center of the axle A of the facing two wheels (wheels 2 and 3).

In addition, as shown in FIG. 1D, in order to equally apply a load to the wheels 2, 3, and 4, when viewed from the outside in the right-left direction, for a ratio of a distance a between the rotary shaft 13 connecting the structure 6 and the structure 7 to each other and a straight line connecting the ground contact points of the wheels 2 and 3 to each other to a distance b1 from the rotary shaft 13 to the ground contact point of the wheel 4, $a:b1=1:2$ is satisfied. In addition, in order to equalize the loads of the wheel 5 and other wheels, when viewed from the outside in the right-left direction, for a ratio of a distance c from a projected point of the center G of gravity to the horizontal surface to a projected line of the rotary shaft 13 to the horizontal surface to a distance d1 from the ground contact point of the wheel 5 to the projected point of the center G of gravity to the horizontal surface, $c:d1=1:3$ is satisfied.

In addition, in the case where the casters are used as the wheels 4 and 5, relative positions of the ground contact points of the wheels 4 and 5 with respect to the rotary shaft 13 and the center G of gravity are changed in the traveling direction due to yawing.

The states of the casters of the rocker bogie 1 traveling in a forward direction are assumed by the distances b1 and d1 in FIG. 1D.

Meanwhile, it may be designed on the basis of a positional relationship between the support shafts 4a and 5a of the wheels 4 and 5 in consideration of traveling in a rearward direction or a rotation.

In this case, when viewed from the outside in the right-left direction, for a ratio of the distance a between the rotary shaft 13 connecting the structure 6 and the structure 7 to each other and the straight line connecting the ground contact points of the wheels 2 and 3 to each other to a distance b2 from the rotary shaft 13 to the support shaft 4a of the wheel 4, $a:b2=1:2$ may be satisfied. In addition, when viewed from the outside in the right-left direction, for a ratio of the distance c from the projected point of the center G of gravity to the horizontal surface to the projected line of the rotary shaft 13 to the horizontal surface to a distance d2 from the support shaft 5a of the wheel 5 to the projected point of the center G of gravity to the horizontal surface, $c:d2=1:3$ may be satisfied.

Since a structure configured of the structure 6 and the wheels 2 to 4 of the rocker bogie 1 according to the present embodiment is a three-wheel structure, the structure can be in favorable-contact with a road surface having any shape as long as the road surface does not come into contact with the body.

Moreover, in the rocker bogie 1 according to the present embodiment, the structures 6 and 7 are connected to each other by the rotation mechanism 8 having the rotary shaft 13 parallel to the straight line which connects the ground contact points of the wheels 2 and 3 to each other, and a degree of freedom of a rotation is provided around the rotary shaft 13. That is, the structure configured of the wheel 5 and the structure 7 does not obstruct the contact state of the three-wheel structure configured of the wheels 2 to 4 and the structure 6. Accordingly, the rocker bogie 1 can favorably contact a road surface having various shapes as long as the road surface does not come into contact with the structure configured of the wheel 5 and the structure 7.

In addition, since the structure 9 which is the body is placed on the structure 7, each wheel can independently create a favorable contact state along the shapes of various road surfaces as long as the road surface does come into contact with the structures 6 and 7.

Moreover, in the present embodiment, it is assumed that surmountability with respect to a step having a height which is approximately ¼ of the diameter of the wheel and an inclined plane having approximately 10° to 20° is obtained.

[Regarding Rotation-Braking Mechanism]

In addition, in a case where a height dimension of the structure 9 which is the body is large, there is a concern that the rocker bogie may be overturned forward when the rocker bogie suddenly stops or the like. This is because a moment is generated in a direction in which the wheel 5 is lifted due to the sudden stop and the structure 9 rotates via the rotary shaft. In overturning performance in the forward direction, if the vertical projection line of the center of gravity is positioned at the front side of the rotary shaft, overturning is generated, and compared to a case where the overturning is not generated if the vertical projection line of the center of gravity is not positioned at the front side of the ground contact point of the wheel 4 in the case of general facing two-wheels, a margin deteriorates to approximately 1/3 in terms of the distance from the center.

Figure 6:
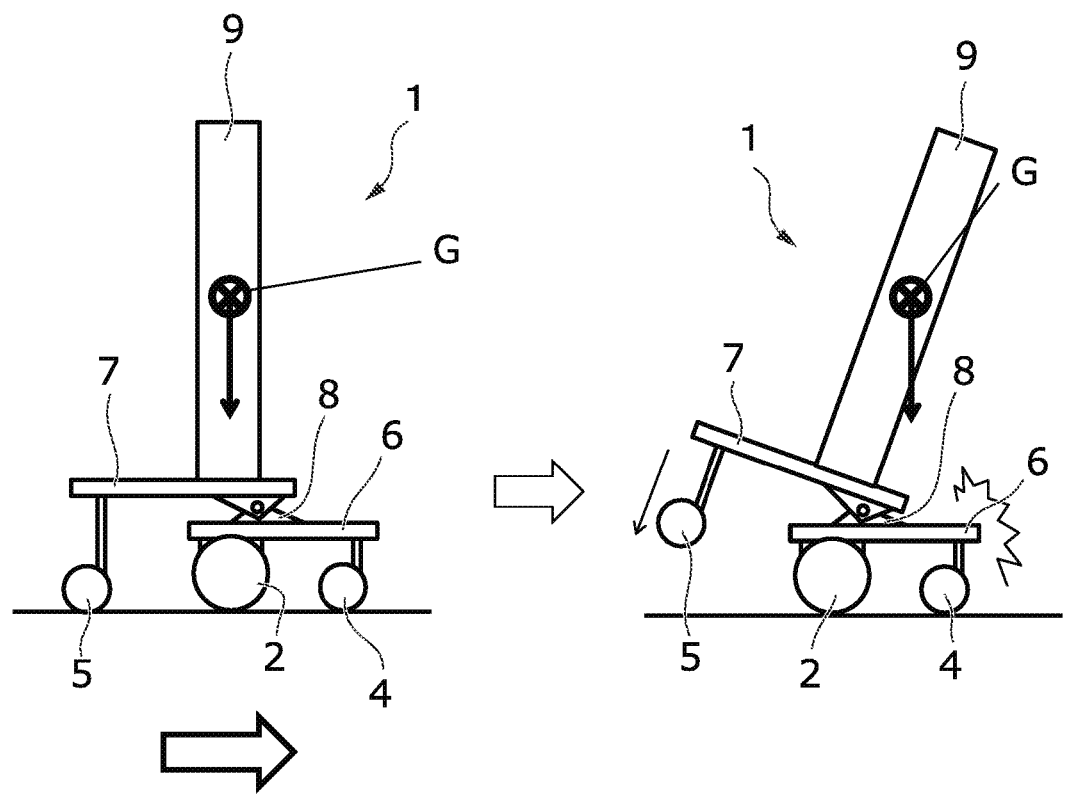
FIG. 6 shows a behavior when the rocker bogie 1 suddenly stops.

The cause of this deterioration is that the rocker bogie structure is configured as described in the present embodiment, and the overturning in the forward direction is generated about the rotary shaft 13. Accordingly, in a case where the rocker bogie 1 falls forward as shown by an arrow of the right drawing of FIG. 6, it is possible to prevent overturning by braking the rotation of the rocker bogie 1 in the forward direction (direction in which the wheel 5 moves away from the ground contact surface) about the rotary shaft 13.

In addition, in order to improve overturning performance in the forward direction, a rotation-braking mechanism may be attached to the rotary shaft 13. The rotation-braking mechanism has a configuration which stops the rotation of the rotary shaft 13 in the direction in which the wheel 5 moves away from the ground contact surface if the contact force of the wheel 5 becomes approximately zero.

[Measures for Improving Forward Overturning Limit Performance and Operation 1]

An example which is realized by using the contact load of the wheel 5 being decreased by moving the center of gravity forward and operating the above-described rotation-braking mechanism 20 is described with reference to FIG. 7.

Figure 7:
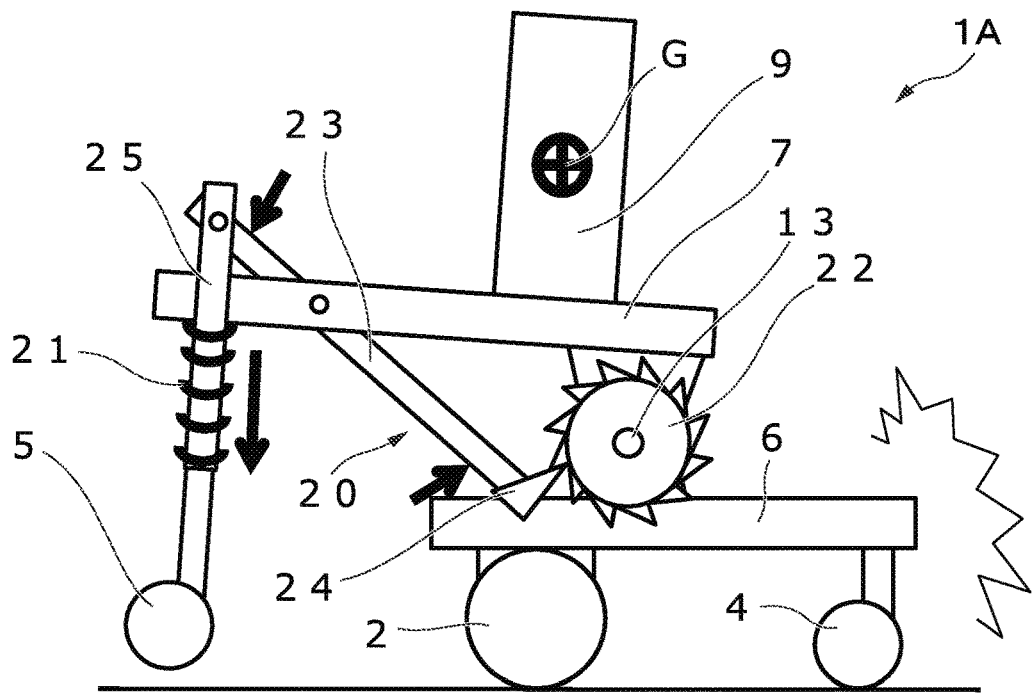
FIG. 7 shows a rocker bogie 1A having a rotation-braking mechanism 20.

FIG. 7 shows a rocker bogie 1A having the rotation-braking mechanism 20. In addition, the same reference numerals are assigned to the same components as those of the rocker bogie 1, and descriptions thereof are omitted.

The rotation-braking mechanism 20 is configured of an extension spring 21, a ratchet gear 22, an engagement member 23, a pawl 24, and a vertical movement bar 25.

In the rocker bogie 1A, the wheel 5 is provided on a lower end of the vertical movement bar 25. An upper end of the vertical movement bar 25 is positioned above the structure 7 and is rotatably connected to the engagement member 23.

The extension spring 21 can move the wheel 5 in the up-down direction via the vertical movement bar 25. One end of the extension spring 21 is attached to the structure 7 and the other end of the extension spring 21 is attached to the vertical movement bar 25. Here, the extension spring 21 is set so as to extend when the contact load of the wheel 5 decreases and to shrink when the wheel 5 is in contact with the ground. If the extension spring 21 extends, the vertical movement bar 25 and the wheel 5 move downward.

The engagement member 23 is linearly provided from the upper end of the vertical movement bar 25 toward the ratchet gear 22 (rotary shaft 13). One end of the engagement member 23 is connected to the upper end of the vertical member bar 25 via a rotary shaft. The pawl 24 which is processed so as to engage with the ratchet gear 22 is provided on the other end of the engagement member 23. In addition, an arbitrary intermediate point of the engagement member 23 is connected to the structure 7 via a rotary shaft.

The ratchet gear 22 is fitted to the rotary shaft 13 and fixed to the structure 6. In addition, although not shown, in a state where the wheel 5 is in contact with the ground and the extension spring 21 does not extend, the engagement member 23 (pawl 24) does not engage with the ratchet gear 22, and as shown in FIG. 7, when the vertical movement bar 25 moves downward by the extension spring 21, the pawl 24 of the engagement member 23 engages with the ratchet gear 22.

Hereinafter, an operation of the rotation-braking mechanism 20 until the forward overturning of the rocker bogie 1A is prevented will be described in detail.

If a forward force is applied to the rocker bogie 1A due to a sudden stop or the like and the contact load of the wheel 5 decreases, as shown in FIG. 7, the spring 21 attached to the wheel 5 extends. Accordingly, the vertical movement bar 25 of the wheel 5 moves in a downward direction (a direction in which the wheel 5 is separated from the structure 7). As a result, the other end of the engagement member 23 of the rotation-braking mechanism 20 which is connected to the vertical movement bar 25 is lowered. Accordingly, the engagement member 23 rotates about the rotary shaft of the engagement member 23 and the structure 7, and the pawl 24 formed on one end of the engagement member 23 moves upward. As a result, the pawl 24 engages with the ratchet gear 22, and the structure 7 is prevented from rotating in a direction in which the wheel 5 is separated from the structure 7 by the rotation-braking mechanism 20. Accordingly, in this state, the forward overturning operations of the structure 6 and the structure 7 are prevented. As a result, even when the vertical projection point of the center of gravity is positioned at the front side of the rotary shaft 13, a structure which is not overturned can be realized as long as the vertical projection point does not exceed the ground contact point of the wheel 4 in a forward direction.

In addition, if the center of gravity is positioned rearward and an appropriate load is applied to the wheel 5, the pawl 24 is released from the ratchet gear 22, and the structure 7 can freely rotate about the rotary shaft 13 with respect to the structure 6.

[Measures for Improving Forward Overturning Limit Performance and Operation 2]

Figure 8:
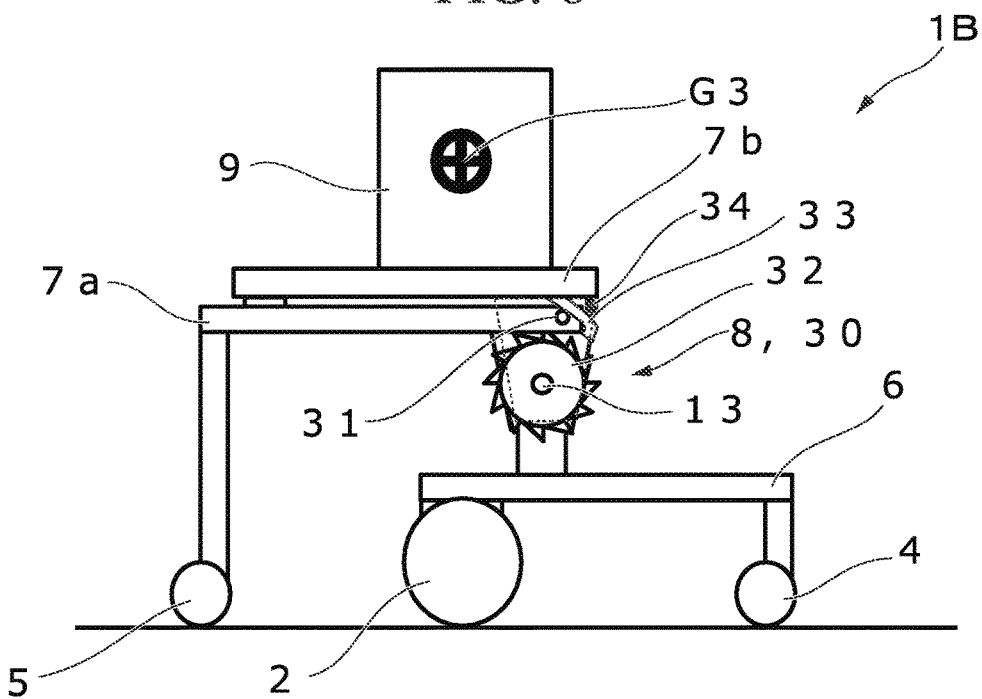
FIG. 8 shows a rocker bogie 1B having a rotation-braking mechanism 30.

FIG. 8 shows a rocker bogie 1B having a rotation-braking mechanism 30. The same reference numerals are assigned to the same components as those of the rocker bogie 1, and descriptions thereof are omitted.

As another method for preventing the rocker bogie from being overturned forward, there is a method which divides the structure 7 into two portions. In the rocker bogie 1B shown in FIG. 8, the above-described structure 7 of the rocker bogie 1 is configured of a structure 7a in which a wheel is provided on the rear side and a structure 7b which overlaps on the structure 7a and supports the structure 9 which is the body.

The rotation mechanism 8 having the rotary shaft 13 is provided on the structure 6. In addition, the structure 7a and the structure 7b are attached so as to rotate about the rotary shaft 13. The structure 9 which is the body is installed on the structure 7b.

In general, the structure 6 is in contact with the ground via three wheels 2 to 4, and the structure 7a is in contact with the ground via the wheel 5 while being supported by the structure 6. The structure 7b is supported by the structure 6 and is also supported by the structure 7a. In the above-described configuration, if the rocker bogie is suddenly stopped by a sudden braking or the like, the structure 7a and the structure 7b rotate forward about the rotary shaft 13. In addition, due to the configuration of the structure 6, the center of gravity is low, and the rocker bogie is less likely to extremely rotate when the rocker bogie suddenly stops.

In the rocker bogie 1B, the rotation braking mechanism 30 is configured using rotations of the structure 7a and the structure 7b with respect to the structure 6. The rotation-braking mechanism 30 is configured of operation bars 31, ratchet gears 32, ratchet claws 33, and extension springs 34.

Figure 9:
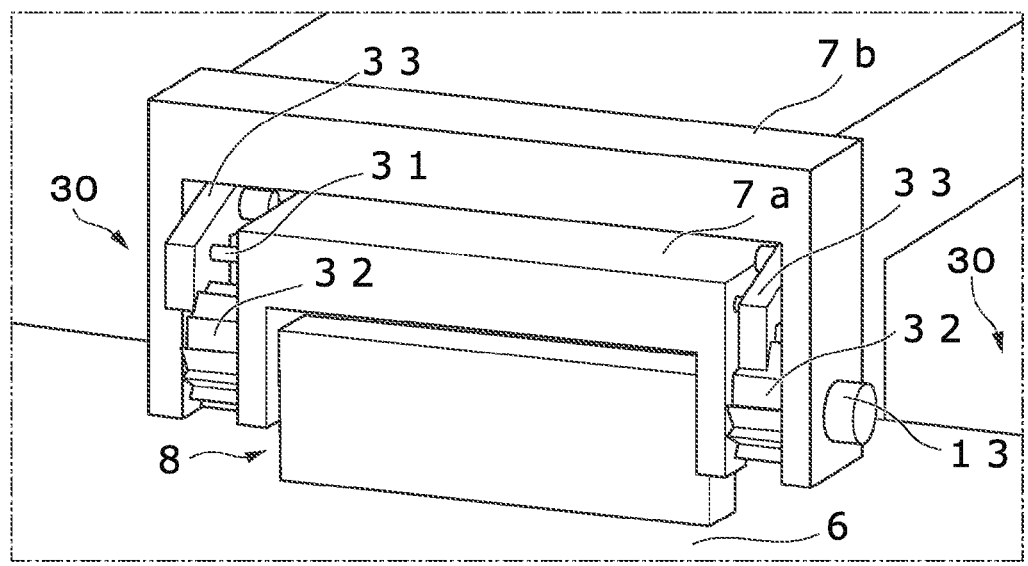
FIG. 9 shows details of the rotation-braking mechanism 30 of the rocker bogie 1B.
Figure 10:
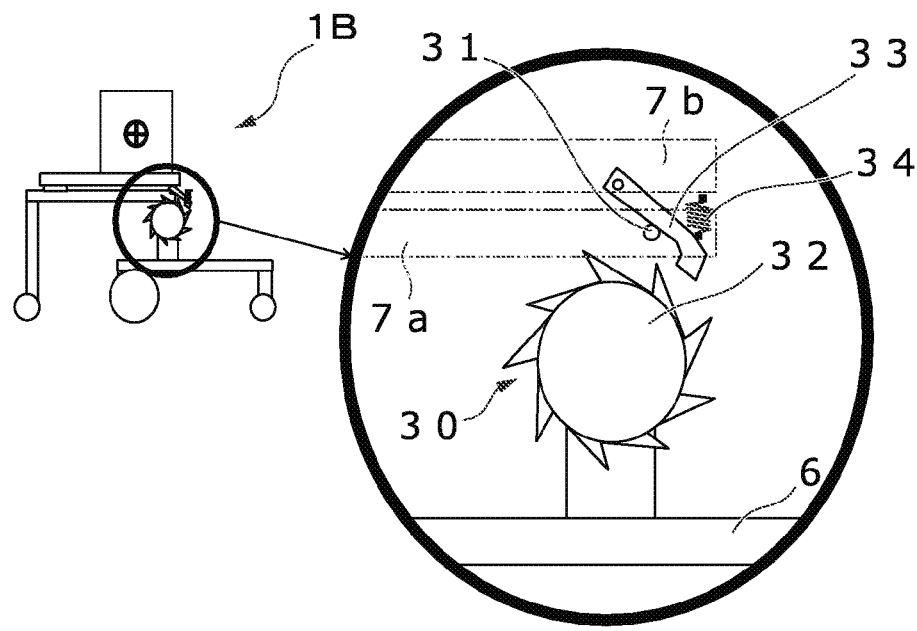
FIG. 10 shows a state before the rotation-braking mechanism 30 of the rocker bogie 1B is locked.

As shown in FIG. 9, the rotation-braking mechanism 30 is provided outside the rotation mechanism 8 having the rotary shaft 13 in the right-left direction. Each of two operation bars 31 is provided on each of both sides of the rotation mechanism 8 in the right-left direction in the front end portion of the structure 7a, and supports the ratchet claw 33 described below. The ratchet gears 32 are provided below the operation bars 31, are fixed to the structure 6, and do not rotate. The ratchet claws 33 and the extension springs 34 are disposed above the operation bars 31 and the ratchet gears 32 and are attached to the structure 7b. As shown in FIG. 10, the tip portion of each of the ratchet claws 33 is configured so as to be movable downward from above by an extension spring 34. Each of the extension springs 34 is compressed in a state where the operation bar 31 supports the ratchet claw 33. That is, if the structure 7b rotates relative to the structure 7a, the support of the ratchet claw 33 by the operation bar 31 is released, the tip of the ratchet claw 33 is pressed downward by a restoring force of the extension spring 34, and the ratchet claw 33 and the ratchet gear 32 engage with each other. In addition, for easy understanding of the configuration of the rotation-braking mechanism 30 in FIGS. 10 to 13, the rotation mechanism 8 or the like is appropriately omitted.

Engagement between the ratchet claw 33 and the ratchet gear 32 will be described in detail. In a state where the structure 7b does not rotate relative to the structure 7a, the ratchet claw 33 does not come into contact with the ratchet gear 32, and the ratchet claw 33 is stopped by the operation bar 31 immediately before the ratchet claw 33 comes into contact with the ratchet gear 32. Accordingly, in a general state, the structure 7a and the structure 7b freely rotate with respect to the structure 6. That is, the ratchet claw 33 does not move downward as long as the structure 7a and the structure 7b are integrated with each other.

Figure 11:
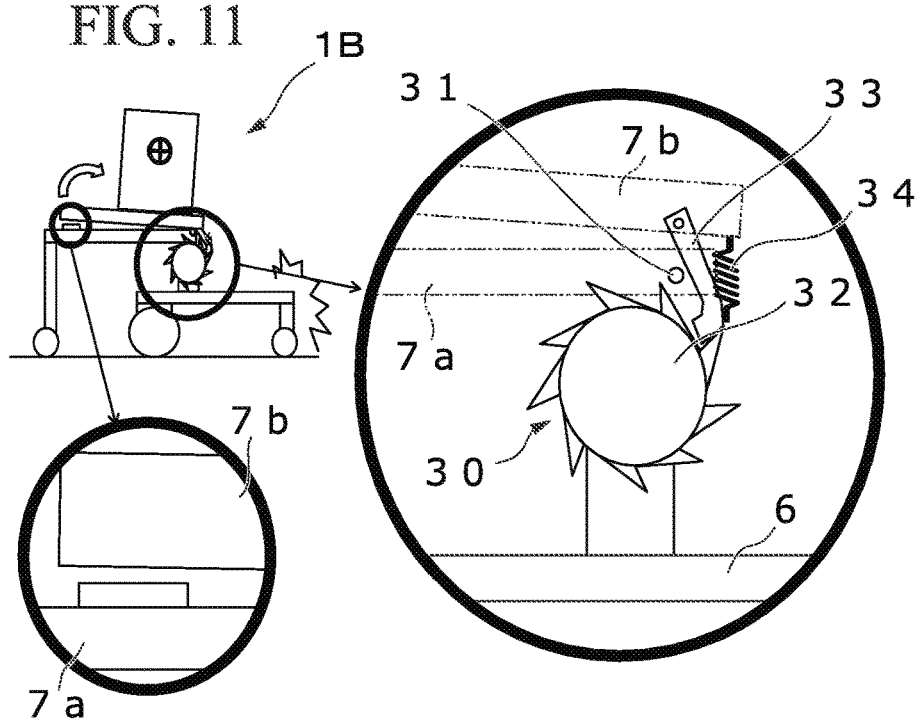
FIG. 11 shows a state where the rotation-braking mechanism 30 of the rocker bogie 1B is locked when the rocker bogie 1B suddenly stops.

On the other hand, when the structure 7a and the structure 7b are not integrated with each other, that is, when the structure 7a moves away from the structure 7b, as shown in FIG. 11, the ratchet claw 33 moves away from the operation bar 31. Accordingly, the tip of the ratchet claw 33 supported by the operation bar 31 moves downward by the restoring force of the extension spring 34. According to this movement, the ratchet claw 33 engages with the ratchet gear 32. As a result, the rotations of the structure 7a and the structure 7b are stopped by the rotation braking mechanism 30, and it is possible to prevent the locker bogie 1B from being overturned.

Figure 12:
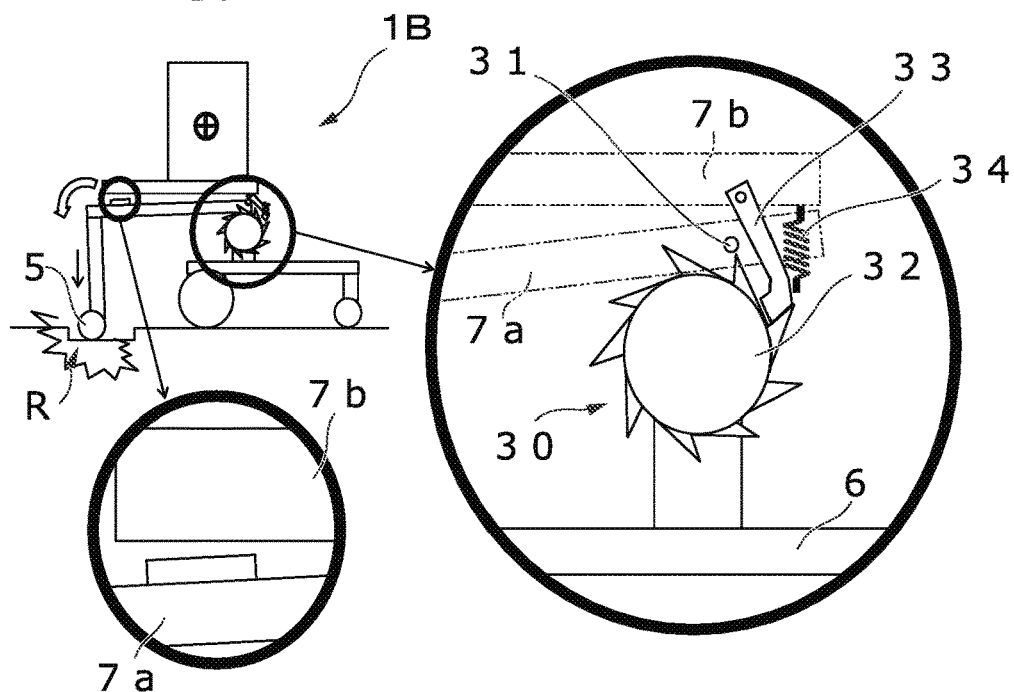
FIG. 12 shows a state where a wheel 5 falls in a depression and the rotation-braking mechanism 30 of the rocker bogie 1B is locked.

In addition, as shown in FIG. 12, even in a state where the wheel 5 suddenly falls in a depression R during traveling, the rotation-braking mechanism 30 is operated, and the rotations of the structure 7a and the structure 7b with respect to the structure 6 are locked. However, in this case, since the structure 7a and the structure 7b rotate in the direction opposite to the lock direction, the rotations do not stop.

Figure 13A:
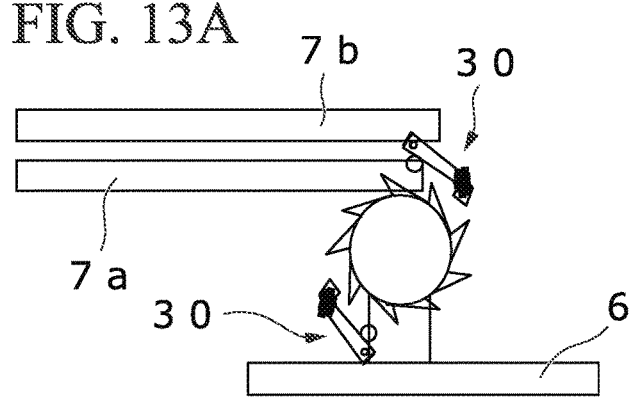
FIG. 13A shows a configuration example in a case where two rotation-braking mechanisms 30 are provided.
Figure 13B:
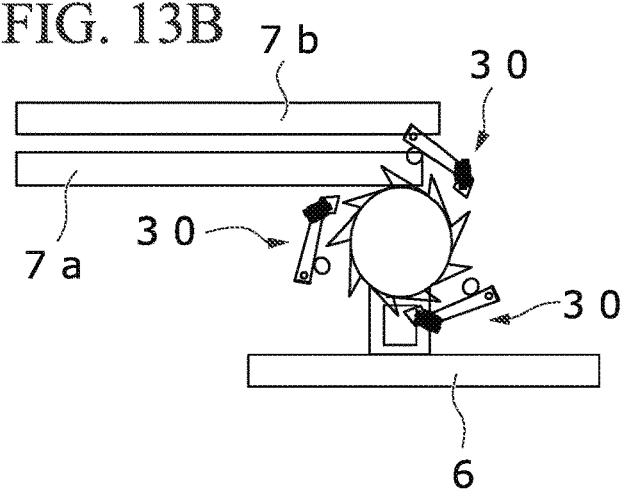
FIG. 13B shows a configuration example in a case where three rotation-braking mechanisms 30 are provided.
Figure 13C:
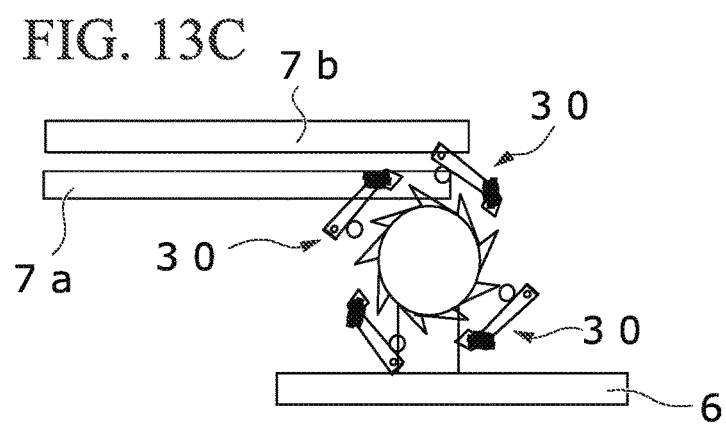
FIG. 13C shows a configuration example in a case where four rotation-braking mechanisms 30 are provided.

Moreover, FIGS. 13A to 13C respectively show configuration examples in cases where the number of rotation-braking mechanism 30 is two, three, and four. If the number of the rotation-braking mechanisms 30 increases, a force at the time of sudden braking is dispersed, it is possible to prevent the rotation-braking mechanisms 30 from being damaged, which is preferable. In addition, in a case where a plurality of rotation-braking mechanisms 30 are provided, addition of members or the like may be performed such that the operation bar, the ratchet claw, and the extension spring can be appropriately installed in the structure 7b and the structure 7a.

Moreover, in the above descriptions, the configuration in which the ratchet gear is used as the rotation-braking mechanism is shown. However, the present invention is not limited to this as long as it is configured so as to prevent the rocker bogie from being overturned forward. For example, a circuit for controlling a relative rotation between the structures may be mounted so as to be electrically controlled, and the upper surface of the structure 6 and the lower surface of the structure 7 may be connected to each other by a string, an extension spring, or the like so as to simply control the rotation angle.

[Measures for Improving Stability at the Time of Starting]

Figure 14:
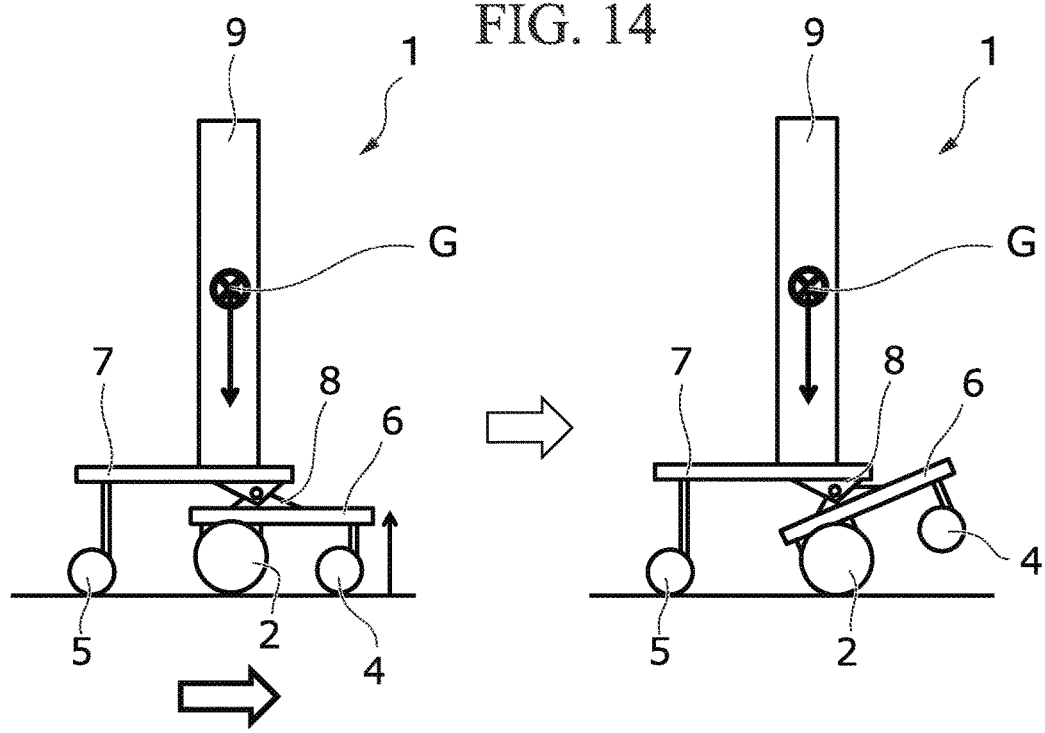
FIG. 14 shows a behavior when the rocker bogie 1 suddenly starts.

Moreover, in a case where a height dimension of the structure 9 which is the body is large, as shown in FIG. 14, there is a concern that the front wheel of the rocker bogie is lifted at the time of sudden starting and the rocker bogie is unstable. This is because the rotary shaft 13 is positioned to be higher than the axle of the two wheels 2 and 3 facing each other which are driving wheels and a moment is generated in the direction in which the wheel 4 which is the front wheel is lifted.

Figure 15A:
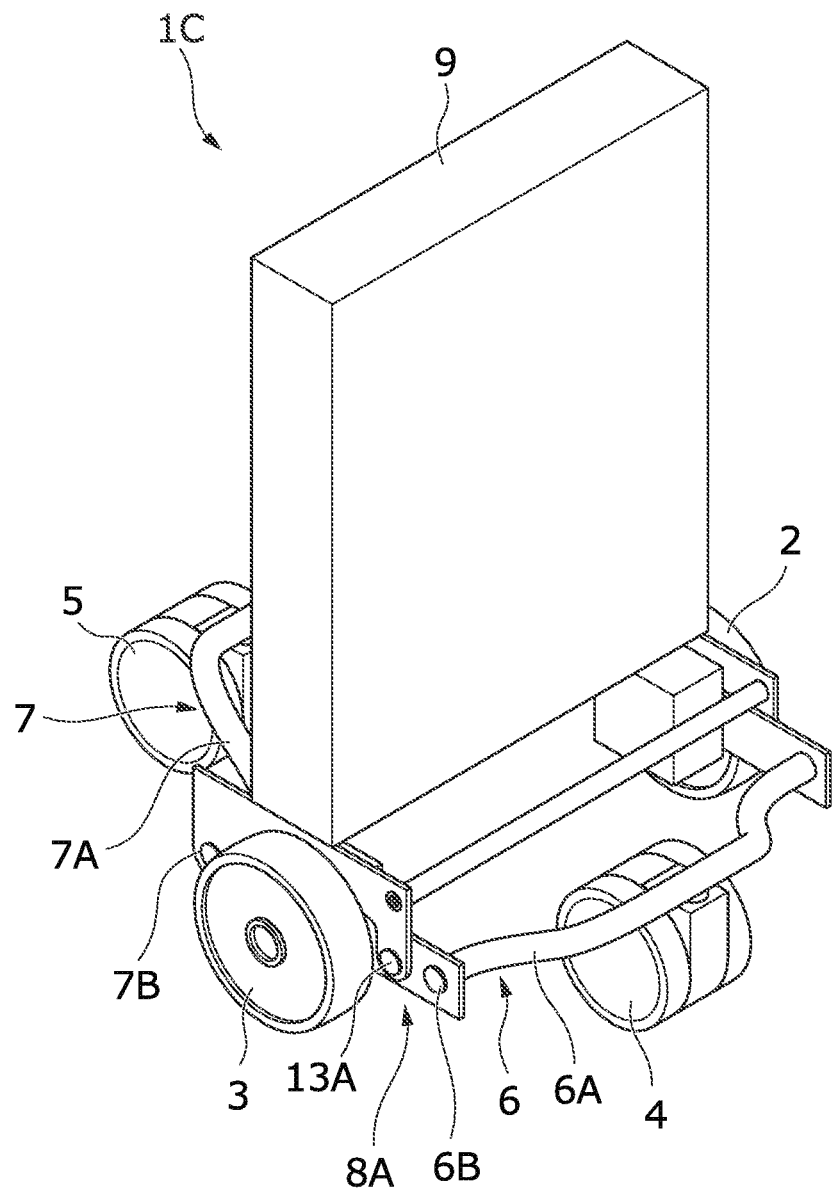
FIG. 15A is a top perspective view showing a rocker bogie 1C.
Figure 15B:
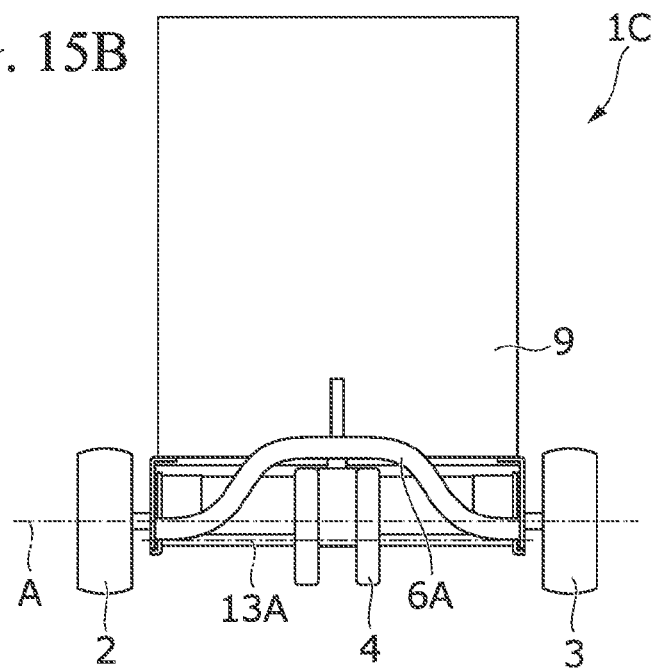
FIG. 15B is a front view showing the rocker bogie 1C.
Figure 15C:
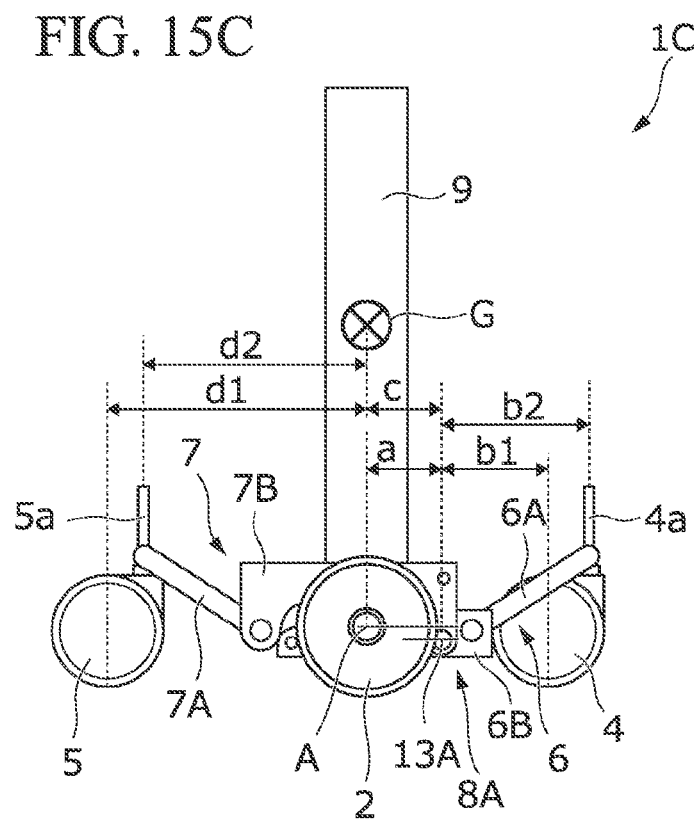
FIG. 15C is a side view showing the rocker bogie 1C.
Figure 16:
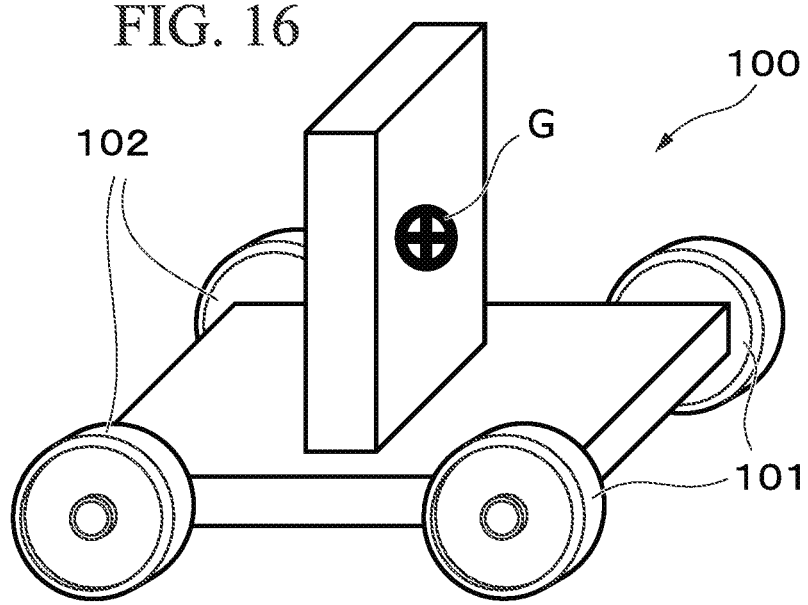
FIG. 16 shows a four-wheel structure mechanism 100 of the related art.
Figure 17:
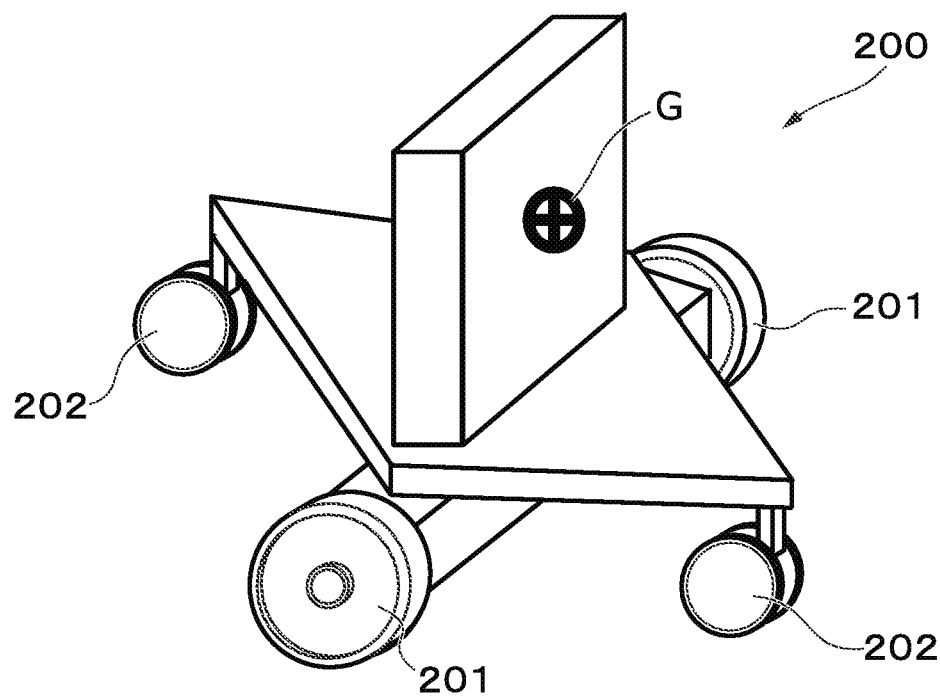
FIG. 17 shows a facing two-wheel structure mechanism 200 of the related art.
Figure 18:
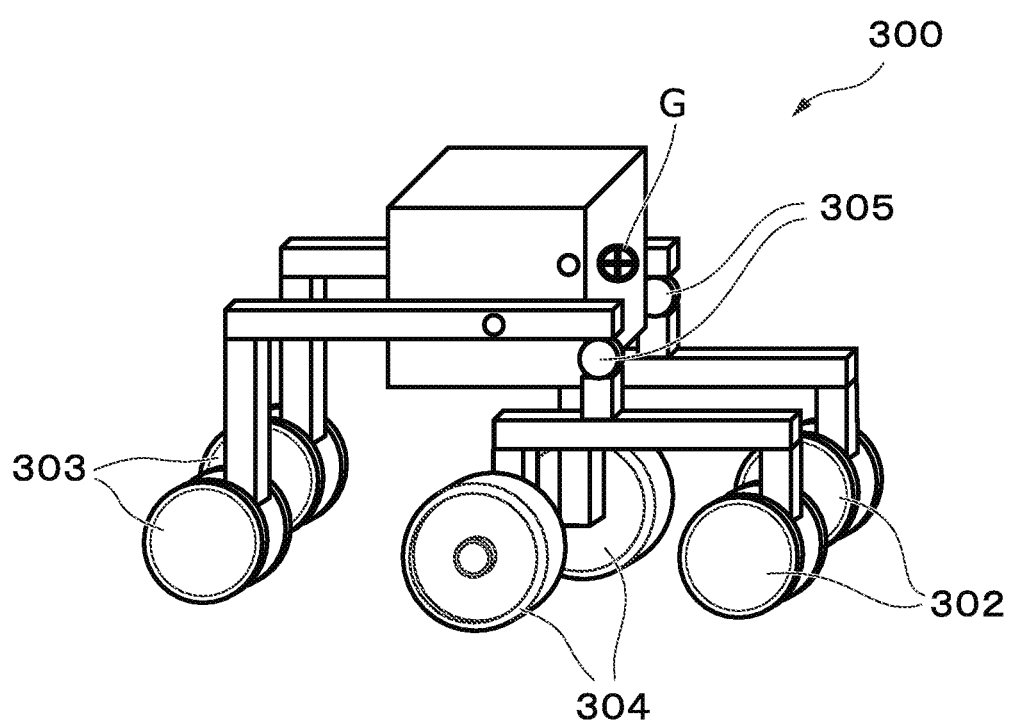
FIG. 18 shows a rocker bogie 300 having a structure including six wheels in the related art.

FIGS. 15A to 15C show a rocker bogie 1C having the rotation-braking mechanism 30. The same reference numerals are assigned to the same components as those of the rocker bogie 1, and descriptions thereof are omitted.

FIG. 15A is a top perspective view of the rocker bogie 1C, FIG. 15B is a front view of the rocker bogie 1C, and FIG. 15C is a side view of the rocker bogie 1C.

As shown in FIGS. 15A to 15C, the rocker bogie 1C is different from the rocker bogie 1 in that the position of the rotary shaft 13A in the vertical direction is the same as the position of an axle A of the two wheels 2 and 3 facing each other which are driving wheels or is disposed below the axle A in the vertical direction in a state where the rocker bogie 1C is placed on the horizontal surface.

As described above, as shown in FIG. 15C, in the rocker bogie 1C, the structure 6 is configured of an inclination portion 6A and a horizontal portion 6B. The inclination portion 6A is inclined upward in the forward direction and is connected to the wheel 4. The horizontal portion 6B is connected to the two wheels 2 and 3 facing each other and horizontally extends in the forward-rearward direction. The inclination portion 6A and the horizontal portion 6B are connected to be fixed to each other between the wheel 4 and the two wheels 2 and 3 facing each other in the forward-rearward direction. In the rocker bogie 1C, since the inclination portion 6A is provided, it is possible to lower the position of the rotary shaft 13A, and it is possible to secure a height required so as to connect the wheel 4 which is the caster wheel and the structure 6 to each other.

Moreover, the structure 7 is configured of an inclination portion 7A and a curved portion 7B. The inclination portion 7A is inclined upward in the rearward direction and is connected to the wheel 5. The curved portion 7B is curved so as to surround the axle A of the two wheels 2 and 3 facing each other from above, and is disposed above the horizontal portion 6B of the structure 6. The inclination portion 7A and the curved portion 7B are connected to be fixed to each other between the wheel 5 and the two wheels 2 and 3 facing each other in the forward-rearward direction. In the rocker bogie 1C, since the inclination portion 7A is provided, it is possible to lower the position of the rotary shaft 13A, and it is possible to secure a height required so as to connect the wheel 5 which is the caster wheel and the structure 7 to each other.

The horizontal portion 6B of the structure 6 and the curved portion 7B of the structure 7 are connected to each other so as to be rotatable about a rotary shaft 13A via a rotation mechanism 8A which is formed between the wheel 4 and the two wheels 2 and 3 facing each other. Here, the position of the rotary shaft 13A in the vertical direction is the same as the position of an axle A of the two wheels 2 and 3 facing each other which are driving wheels or is disposed below the axle A in the vertical direction.

Accordingly, even in a case where a height dimension of the structure 9 which is the body is large, since the rotary shaft 13A is positioned at a sufficient low position, it is possible to decrease a moment which is operated in the direction in which the wheel 4 which is the front wheel is lifted at the time of sudden starting.

Therefore, according to this configuration, it is possible to prevent the front wheel of the rocker bogie from being lifted at the time of sudden starting. Accordingly, it possible to maintain a state where all four wheels are in contact with the ground surface even at the time of sudden staring, and it is possible to more stabilize the rocker bogie 1C.

Considering a degree of freedom in design, the rotary shaft 13A may be positioned at a slightly higher position than that of the axle A of the two wheels 2 and 3 facing each other which are driving wheels.

For example, if the position of the rotary shaft 13A in the vertical direction when the rocker bogie 1C is placed on the horizontal surface is lower than 1.1 times of the radius (the height of axle) of each of the two wheels 2 and 3 facing each other, it is possible to prevent the moment which is operated in the direction in which the wheel 4 which is the front wheel is lifted at the time of sudden starting.

Moreover, more preferably, the position of the rotary shaft 13A in the vertical direction when the rocker bogie 1C is placed on the horizontal surface is 0.8 to 1.0 times of the radius of each of the two wheels 2 and 3 facing each other. If the position of the rotary shaft 13A is equal to or less than 1.0 times of the radius of each of the two wheels 2 and 3 facing each other, since the rotary shaft 13A is lower than the axle A of the two wheels 2 and 3 facing each other, it is possible to sufficiently decrease the moment which is operated in the direction in which the wheel 4 is lifted at the time of sudden starting. Accordingly, it is possible to prevent the front wheel 4 of the rocker bogie 1C from being lifted. Moreover, if the position of the rotary shaft 13A is 0.8 times or more of the radius of each of the two wheels 2 and 3 facing each other, it is possible to secure a space for getting over a small obstacle between the structures 6 and 7 and the ground contact surface.

In addition, a mechanism may be provided, which physically prevents the front wheel 4 from being lifted at the time of sudden starting using the principle of the rotation-braking mechanism described with reference to FIG. 7 or 8.

Moreover, also in the rocker bogie 1C, preferably, when viewed from the outside in the right-left direction, for a ratio of a distance a between the rotary shaft 13A connecting the structure 6 and the structure 7 to each other and a straight line connecting the ground contact points of the wheels 2 and 3 to each other to the distance b1 from the rotary shaft 13A to the contact point of the wheel 4, a:b1=1:2 is satisfied. In addition, preferably, when viewed from the outside in the right-left direction, for a ratio of the distance c from the projected point of the center G of gravity to the horizontal surface to a projected line of the rotary shaft 13A to the horizontal surface to the distance d1 from the ground contact point of the wheel 5 to the projected point of the center G of gravity to the horizontal surface, c:d1=1:3 is satisfied.

In addition, similarly to the rocker bogie 1, also in the rocker bogie 1C, considering the traveling in the rearward direction or the rotation, the distances b2 and d2 on the basis of the positions of the support shafts 4a and 5a may be used. In this case, a:b2=1:2 and c:d2=1:3 may be satisfied.

In the above, some configurations for improving the forward overturning limit performance or some configuration for improving stability at the time of starting are described. However, each of the configurations may be singularly used, or combinations thereof may be used if necessary.

Moreover, the structure 9 which is the body is not limited. However, a structure having metal parts and heavy weight, a structure having a height which is 3 times or more than the dimension of the rocker bogie in the right-left direction and the forward-rearward direction, or the like may be used. Even in a case where the structure 9 having a high height and heavy weight is provided, if the configuration of the rocker bogie according to the present embodiment is used, it is possible to move the rocker bogie in a state where the balance of the entire body is stable.

Moreover, in the rocker bogie according to the present embodiment, a sensor which can detect an obstacle in front may be mounted, and traveling may be stopped in a case where an obstacle having a predetermined size or more is detected. In this case, a contact type sensor which can detect a predetermined height or more may be provided at a predetermined position of the rocker bogie, and a non-contact type sensor such as an optical sensor or an ultrasonic sensor may be used. Accordingly, for example, even in a case where a structure having heavy weight as the structure 9 which is the body is used, the rocker bogie gets over an obstacle, and it is possible to prevent from being damaged by the obstacle.

In addition, with respect to a:b1(b2)=1:2 and c:d1(d2)=1:3, the above-described ratios are not required to be strictly satisfied. That is, a certain degree of error is acceptable as long as a load is approximately equally applied to each wheel.

Hereinbefore, preferred embodiments of the present invention are described. However, the present invention is not limited to this. Additions, omissions, replacements, and other modifications of configurations may be applied within a scope which does not depart from the gist of the present invention. The present invention is not limited by the above-described inventions and is limited by only the attached claims.

DESCRIPTION OF REFERENCE SIGNS

1, 1A, 1B, 1C: rocker bogie, 2: wheel (first wheel), 3: wheel (second wheel), 4: wheel (third wheel), 5: wheel (fourth wheel), 6: structure (first base), 7,7a, 7b: structure (second base), 9: structure, 13, 13A: rotary shaft, A: axle (first straight line), 20, 30: rotation-braking mechanism

The invention claimed is:
1. A rocker bogie, comprising:
a first base including a first wheel, a second wheel, and a third wheel each of which is configured to be in contact with a first flat surface;
a second base including a fourth wheel which is configured to be in contact with the first flat surface;

a rotary shaft connecting the first base and the second base to each other such that the second base is rotatable with respect to the first base; and a structure placed on the second base, wherein the rotary shaft is parallel to a first straight line which connects a rotation center of the first wheel and a rotation center of the second wheel to each other and is disposed between a rotation center of the third wheel and the first straight line in a forward-rearward direction, the fourth wheel is disposed at an opposite position to the third wheel across the first straight line, when viewed in a right-left direction, a ratio of a distance from a ground contact position of the third wheel to the rotary shaft in the forward-rearward direction to a distance from the first straight line to the rotary shaft in the forward-rearward direction is 2:1, and a center of gravity of the entire rocker bogie including the structure is positioned immediately above the first straight line, in the case where, when viewed in the right-left direction, a distance in the forward-rearward direction from a projected point of the center of the gravity on the first flat surface to a projected line of the rotary shaft on the first flat surface is defined as "c", and a distance in the forward-rearward direction from the ground contact position of the fourth wheel to the projected point of the center of the gravity on the first flat surface is defined as "d1", c:d1=1:3 is satisfied.

2. The rocker bogie according to claim 1, wherein a center of gravity of the structure is positioned between the rotation center of the fourth wheel and the rotary shaft in a plan view.

3. The rocker bogie according to claim 1, further comprising:

a rotation-braking mechanism which restricts rotation of the rotary shaft in a direction in which the fourth wheel moves away from a ground contact surface when the fourth wheel moves away from the ground contact surface.

4. The rocker bogie according to claim 1, wherein in a state where the rocker bogie is placed on a horizontal surface, a position of the rotary shaft in a vertical direction is the same as or vertically below a position of the first straight line.

5. A rocker bogie, comprising:

a first base including a first wheel, a second wheel, and a third wheel each of which is configured to be in contact with a first flat surface;

a second base including a fourth wheel which is configured to be in contact with the first flat surface;

a rotary shaft connecting the first base and the second base to each other such that the second base is rotatable with respect to the first base; and a structure placed on the second base, wherein the rotary shaft is parallel to a first straight line which connects a rotation center of the first wheel and a rotation center of the second wheel to each other and is disposed between a rotation center of the third wheel and the first straight line in a forward-rearward direction, the fourth wheel is disposed at an opposite position to the third wheel across the first straight line, and when viewed in a right-left direction, a ratio of a distance from a support shaft of the third wheel to the rotary shaft in the forward-rearward direction to a distance from the first straight line to the rotary shaft in the forward-rearward direction is 2:1, and a center of gravity of the entire rocker bogie including the structure is positioned immediately above the first straight line, in the case where, when viewed in the right-left direction, a distance in the forward-rearward direction from a projected point of the center of the gravity on the first flat surface to a projected line of the rotary shaft on the first flat surface is defined as "c", and a distance in the forward-rearward direction from the support shaft of the fourth wheel to the projected point of the center of the gravity on the first flat surface is defined as "d2", c:d2=1:3 is satisfied.

6. The rocker bogie according to claim 5, wherein a center of gravity of the structure is positioned between the rotation center of the fourth wheel and the rotary shaft in a plan view.

7. The rocker bogie according to claim 5, further comprising:

a rotation-braking mechanism which restricts rotation of the rotary shaft in a direction in which the fourth wheel moves away from a ground contact surface when the fourth wheel moves away from the ground contact surface.

8. The rocker bogie according to claim 5, wherein in a state where the rocker bogie is placed on a horizontal surface, a position of the rotary shaft in a vertical direction is the same as or vertically below a position of the first straight line.

* * * * *